(12) United States Patent
Ishida et al.

(10) Patent No.: US 10,704,541 B2
(45) Date of Patent: Jul. 7, 2020

(54) SLIDE MEMBER, REFRIGERANT COMPRESSOR INCORPORATING SLIDE MEMBER, REFRIGERATOR AND AIR CONDITIONER

(71) Applicant: Panasonic Corporation, Kadoma-shi, Osaka (JP)

(72) Inventors: Yoshinori Ishida, Kyoto (JP); Hirotaka Kawabata, Shiga (JP); Hiroyuki Fukuhara, Shiga (JP); Yuichiro Kume, Shiga (JP); Yoshiyuki Futagami, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 404 days.

(21) Appl. No.: 14/379,838

(22) PCT Filed: Feb. 15, 2013

(86) PCT No.: PCT/JP2013/000852
§ 371 (c)(1),
(2) Date: Aug. 20, 2014

(87) PCT Pub. No.: WO2013/125197
PCT Pub. Date: Aug. 29, 2013

(65) Prior Publication Data
US 2016/0017874 A1    Jan. 21, 2016

(30) Foreign Application Priority Data

Feb. 20, 2012  (JP) ................................. 2012-033715
Oct. 24, 2012  (JP) ................................. 2012-234380
Oct. 30, 2012  (JP) ................................. 2012-238651

(51) Int. Cl.
F04B 39/00     (2006.01)
F04B 39/02     (2006.01)
C23C 8/14      (2006.01)

(52) U.S. Cl.
CPC ............ F04B 39/0005 (2013.01); C23C 8/14 (2013.01); F04B 39/023 (2013.01);
(Continued)

(58) Field of Classification Search
CPC .. F04B 39/0292; F04B 39/005; F04B 39/023; C23C 8/14; Y10T 29/49281; Y10T 29/49272; F05C 2253/12
See application file for complete search history.

(56) References Cited

U.S. PATENT DOCUMENTS 3,421,307 A  *  1/1969  Lunsford .................. C23C 8/18
                                                              57/119
3,549,425 A  *  12/1970  Broussard ........... C21B 13/0086
                                                              148/287
(Continued)

FOREIGN PATENT DOCUMENTS

CN         1916408        2/2007
CN       101379313 A      3/2009
(Continued)

OTHER PUBLICATIONS

Supplementary Partial European Search Report issued in corresponding European Application No. 13752545.7, dated Oct. 7, 2015, 5 pages.
(Continued)

Primary Examiner — Christopher S Bobish
(74) Attorney, Agent, or Firm — Hamre, Schumann, Mueller & Larson, P.C.

(57) ABSTRACT

A slide member of the present invention is used in a slide unit which is included in a refrigerant compressor for
(Continued)

compressing a refrigerant and provided inside a sealed container which reserves lubricating oil therein. The slide member is provided with an oxide coating film on a surface of a base material. The oxide coating film is configured such that (1) when the base material comprises an iron based material, the oxide coating film has a three-layer structure including a first layer comprising $Fe_2O_3$, a second layer comprising $Fe_3O_4$, and a third layer comprising FeO in this order from an outermost surface, (2) the oxide coating film has a dense structure having minute concave/convex portions with a height difference which falls within a range of 0.01 μm to 0.1 μm, or (3) when the base material comprises the iron based material, the oxide coating film has a three-layer structure in which the three layers comprise the iron oxides and are different in hardness.

16 Claims, 14 Drawing Sheets

(52) U.S. Cl.
CPC .. *F04B 39/0292* (2013.01); *F05C 2201/0436* (2013.01); *F05C 2253/12* (2013.01); *Y10T 29/49272* (2015.01); *Y10T 29/49281* (2015.01)

(56) References Cited

U.S. PATENT DOCUMENTS

| | | | | |
|---|---|---|---|---|
| 3,900,200 | A * | 8/1975 | Nakamura | F16J 10/04 164/72 |
| 4,110,512 | A * | 8/1978 | Roy | F16J 15/3496 148/276 |
| 4,518,440 | A * | 5/1985 | Phillips, Jr. | C23C 8/80 148/252 |
| 4,714,497 | A * | 12/1987 | Poncet | C21D 1/74 148/287 |
| 4,944,663 | A * | 7/1990 | Iizuka | F01C 21/0809 418/178 |
| 5,087,181 | A | 2/1992 | Kamitsuma et al. | |
| 5,531,574 | A | 7/1996 | Honma | |
| 6,277,214 | B1 * | 8/2001 | Akhtar | C23C 8/14 148/287 |
| 6,726,216 | B2 * | 4/2004 | Horn | F16J 9/26 277/434 |
| 6,807,897 | B2 * | 10/2004 | Birkenbach | C23C 8/34 148/217 |
| 6,860,255 | B2 * | 3/2005 | Yamaguchi | C23C 8/80 123/495 |
| 8,007,713 | B2 * | 8/2011 | Mogami | B22F 3/1146 419/2 |
| 8,187,359 | B2 * | 5/2012 | Tokuda | C21B 13/0053 148/287 |
| 2006/0013706 | A1 * | 1/2006 | Ishida | F04B 39/0261 417/386 |
| 2008/0053396 | A1 * | 3/2008 | Hiraishi | F16J 9/00 123/193.2 |
| 2009/0092796 | A1 * | 4/2009 | Ishida | F16C 33/043 428/172 |
| 2009/0136376 | A1 * | 5/2009 | Nakamura | C10M 105/32 418/179 |
| 2010/0008808 | A1 * | 1/2010 | Yoshimi | F04B 39/00 418/63 |
| 2010/0263422 | A1 | 10/2010 | Saito et al. | |

FOREIGN PATENT DOCUMENTS

| | | |
|---|---|---|
| DE | 42 03 384 | 8/1993 |
| EP | 0 459 778 | 12/1991 |
| EP | 1 198 606 B1 | 3/2004 |
| EP | 1 577 553 | 9/2005 |
| JP | 3-62890 | 3/1991 |
| JP | H0476295 | 3/1992 |
| JP | H05106581 A | 4/1993 |
| JP | 7-238885 | 9/1995 |
| JP | H07317678 | 12/1995 |
| JP | H09228972 A | 9/1997 |
| JP | H11120888 A | 4/1999 |
| JP | 2003134854 A | 5/2003 |
| JP | 2005083339 A | 3/2005 |
| JP | 2007332838 A | 12/2007 |
| JP | 2008-223604 | 9/2008 |
| JP | 2010-185286 | 8/2010 |
| JP | 2011-12305 | 1/2011 |
| WO | 01/04374 | 1/2001 |
| WO | WO 2009/088036 | 7/2009 |

OTHER PUBLICATIONS

Weng, et al., "Metal Adhesive Technology", Jan. 31, 2006, pp. 88-89 with a partial English Translation.
Extended European Search Report issued in corresponding European Application, dated Apr. 18, 2016, 11 pages.
Office Action for Chinese application No. 201380006292.3, dated Oct. 27, 2016, 22 pages including English translation.
Office Action issued in corresponding Chinese Application No. 201380006292.3, dated Dec. 22, 2015, 21 pages with a partial English translation.
Office Action issued for Chinese Patent Application No. 201710756268.1, dated Jul. 26, 2018, 12 pages including English translation.
Office Action issued for Chinese Patent Application No. 201710754866.5, dated Jul. 27, 2018, 12 pages including English translation.

\* cited by examiner

RECIPROCATING MOTION

SLIDE MEMBER, REFRIGERANT COMPRESSOR INCORPORATING SLIDE MEMBER, REFRIGERATOR AND AIR CONDITIONER

TECHNICAL FIELD

The present invention relates to a slide member included in a refrigerant compressor for use with a refrigerator, an air conditioner, etc., the refrigerant compressor incorporating the slide member, and a product having a refrigeration cycle incorporating the refrigerant compressor, which is represented by the refrigerator, the air conditioner, etc.

BACKGROUND ART

In recent years, for the purpose of global environment conservation, to reduce the use of fossil fuel, a refrigerant compressor with a higher efficiency has been developed. One approach for achievement of the higher efficiency of the refrigerant compressor is, for example, to reduce a surface pressure applied to the sliding surface of a slide unit included in the refrigerant compressor, thereby realizing smooth sliding.

The slide unit included in the refrigerant compressor is composed of a plurality of slide members which are combined via their sliding surfaces. As the specific example of the slide unit, there are a combination of a main shaft section of a crankshaft and a bearing section, a combination of a piston and a bore, a combination of a thrust section and a thrust washer, a combination of a piston pin and a connecting rod, a combination of an eccentric shaft of the crankshaft and the connecting rod.

As a technique for realizing smooth sliding of the slide unit, for example, there is a sealed compressor disclosed in Patent Literature 1. This sealed compressor accommodates an electric motor and a compressor machine in a sealed case. One of slide members of a slide unit of the compressor machine is provided with a phosphate coating film such as a manganese phosphate based coating film. This phosphate coating film is an insoluble coating film comprising a porous crystalline body.

As schematically shown in FIG. 13, the slide unit includes a first slide member 31 and a second slide member 41. The sliding surface of the second slide member 41 is provided with an insoluble phosphate coating film 20 comprising a porous crystalline body. For example, in a case where the slide unit includes the bore and the piston, the bore is the first slide member 31 and the piston is the second slide member 41. Or, in a case where the slide unit includes the main shaft section of the crankshaft and the bearing section, the bearing section is the first slide member 31 and the main shaft section is the second slide member 41.

In the configuration in which one of the slide members is provided with the phosphate coating film 20, the metal surface of the first slide member 31 and the surface of the phosphate coating film 20 of the second slide member 41, as their sliding surfaces, contact each other even when these slide members comprise metal. This can effectively reduce a possibility of the contact between metal surfaces of the sliding surfaces. Since the phosphate coating film 20 has the porous crystalline body, the retention capability of lubricating oil between the sliding surfaces can be improved. As a result, smooth sliding of the slide unit can be realized.

Patent Literature 1 also discloses that the phosphate coating film 20 covers the processed surface of the sliding surface which is formed by machine processing, and thus a compatibility between the slide members of the slide unit in an initial state can be improved.

Firstly, how the phosphate coating film 20 can suppress the contact between the metal surfaces will be described. For example, in the case where the slide unit includes the bore and the piston, a spacing (clearance) between the bore and the piston is typically set very small to minimize a leakage loss. Depending on conditions such as the shapes and non-uniform accuracy of the bore and the piston, there may be a possibility that the sliding surface of the bore and the sliding surface of the piston partially contact each other. The partial contact tends to occur when the piston reaches a top dead center or a bottom dead center and a sliding velocity becomes zero. As shown in FIG. 13, in the configuration in which the sliding surface of the piston (second slide member 41) is provided with the phosphate coating film 20, the metal surface is not exposed, and therefore, it becomes possible to avoid the metal surface of the piston from directly contacting the metal surface of the bore.

Next, how the phosphate coating film 20 can improve the retention capability of the lubricating oil will be described. When an oil pump is activated according to the rotation of the crankshaft included in the compressor machine, the lubricating oil is fed to the slide units and lubricates them. In the case of the slide unit including the bore and the piston as described above, the phosphate coating film 20 formed on the surface of the piston (second slide member 41) can retain the lubricating oil, in the slide unit of FIG. 13. The retained lubricating oil contributes to smooth sliding between the bore and the piston, and serves to seal the bore and the piston.

CITATION LIST

Patent Literature

Patent Literature 1: Japanese-Laid Open Patent Application Publication No. Hei. 7-238885

SUMMARY OF INVENTION

Technical Problem

However, in recent years, since the refrigerant compressor has been developed to provide a higher efficiency, it is difficult to effectively suppress the contact between the metal surfaces and effectively improve the retention capability of the lubricating oil, using the phosphate coating film disclosed in Patent Literature 1.

Specifically, there has been a tendency that the lubricating oil with a lower viscosity is used to attain a higher efficiency of the refrigerant compressor, and the slide unit is designed so as to have a smaller slide area and a smaller slide length. When the lubricating oil with a relatively high viscosity is used, the lubricating oil is retained well depending on the shape of the porous crystalline body of the phosphate coating film. When the lubricating oil with a low viscosity is used, the retention capability of the porous crystalline body is likely to be degraded.

If the retention capability of the lubricating oil is degraded, then the slide members are not lubricated well during sliding, which may increase a load applied to the sliding surfaces. If the lubricating oil is not retained well, seal performance between the slide members is degraded. As a result, the efficiency of the compression may be negatively affected.

If a load applied to the sliding surfaces increases, the phosphate coating film may be highly likely to be abraded away or worn out. This results in a situation in which the compatibility between the slide members does not last, and the abrasion resistance of the sliding surfaces may be degraded. In addition, since the metal surface is exposed in the abraded portion of the phosphate coating film, the metal surfaces are highly likely to contact each other in the sliding surfaces.

Furthermore, in the step of forming the phosphate coating film on the surface of the slide member, a body (base material) of the slide member may be etched. For this reason, the exposed metal surface resulting from the abrasion of the phosphate coating film is not a smooth surface but a rough surface having unevenness resulting from the etching. As a result, the abrasion resistance of the sliding surface may be further degraded.

In addition, the phosphate coating film is likely to be easily abraded by a refrigerant gas dissolved into the lubricating oil, depending on the kind of the slide unit.

For example, in the case where the slide unit includes the main shaft section of the crankshaft and the bearing section, a load applied to the main shaft section of the crankshaft during a rotation of the crankshaft changes significantly. Although the lubricating oil is retained between the main shaft section and the bearing section, the refrigerant gas dissolved into the lubricating oil may be formed into bubbles due to a change in the load applied to the main shaft section. If the bubbles of the refrigerant gas are generated, a situation in which the lubricating oil between the sliding surfaces is less takes place, so that the sliding surface of the main shaft section and the sliding surface of the bearing section may partially contact each other.

Therefore, if formation of the bubbles of the refrigerant gas occurs with a higher efficiency, the sliding surfaces may partially contact each other with a higher efficiency, and as a result, the phosphate coating film formed on the surface of the main shaft section may be abraded away easily, which causes an increase in a friction coefficient of the sliding surface. The increase in the friction coefficient promotes heat generation in the slide unit, which increases a possibility of an abnormal abrasion of the sliding surface. Such a phenomenon may occur in the same way in another slide unit such as the bore and the piston.

The present invention has been made to solve the above described problem, and an object of the present invention is to provide a slide member having a sliding surface with an improved abrasion resistance, a refrigerant compressor which can realize a high reliability and a high efficiency by using the slide member as a slide unit, and a product having a refrigeration cycle incorporating the refrigerant compressor.

Solution to Problem

To achieve the above described object, according to the present invention, there is provided a slide member which is used in a slide unit which is included in a refrigerant compressor for compressing a refrigerant and provided inside a sealed container which reserves lubricating oil therein, the slide member being configured to comprise the following configurations: (1) a base material comprises an iron based material, and an oxide coating film having a three-layer structure including a first layer comprising $Fe_2O_3$, a second layer comprising $Fe_3O_4$, and a third layer comprising FeO in this order from an outermost surface, is formed on the surface of the base material, (2) a dense oxide coating film having minute concave/convex portions with a height difference which falls within a range of 0.01 μm to 0.1 μm is formed on the surface of the base material, and (3) the base material comprises the iron based material, and the oxide coating film having the three-layer structure in which the three layers comprise the iron oxides and are different in hardness is formed on the surface of the base material.

The slide member of the present invention may comprise two of the above configurations (1) to (3) or all of the above configurations (1) to (3).

To achieve the above object, according to the present invention, there is provided a refrigerant compressor comprising: a sealed container which reserves lubricating oil therein; an electric component accommodated in the sealed container; and a compression component which is accommodated in the sealed container and activated by the electric component to compress a refrigerant; wherein the compression component includes a slide unit including the slide member having at least one of the configurations (1) to (3).

The present invention also includes a product having a refrigeration cycle, incorporating the refrigerant compressor of the present invention, such as a refrigerator comprising the refrigerant compressor, or an air conditioner comprising the refrigerant compressor.

The above and further objects, features, and advantages of the invention will more fully be apparent from the following detailed description with accompanying drawings.

Advantageous Effects of Invention

The present invention has advantages that with the above described configuration, it becomes possible to provide a slide member which can improve an abrasion resistance of a sliding surface, a refrigerant compressor which can attain a high reliability and a high efficiency by using the slide member as a slide unit, and a product having a refrigeration cycle, incorporating the refrigerant compressor.

DESCRIPTION OF EMBODIMENTS

Figure 1:
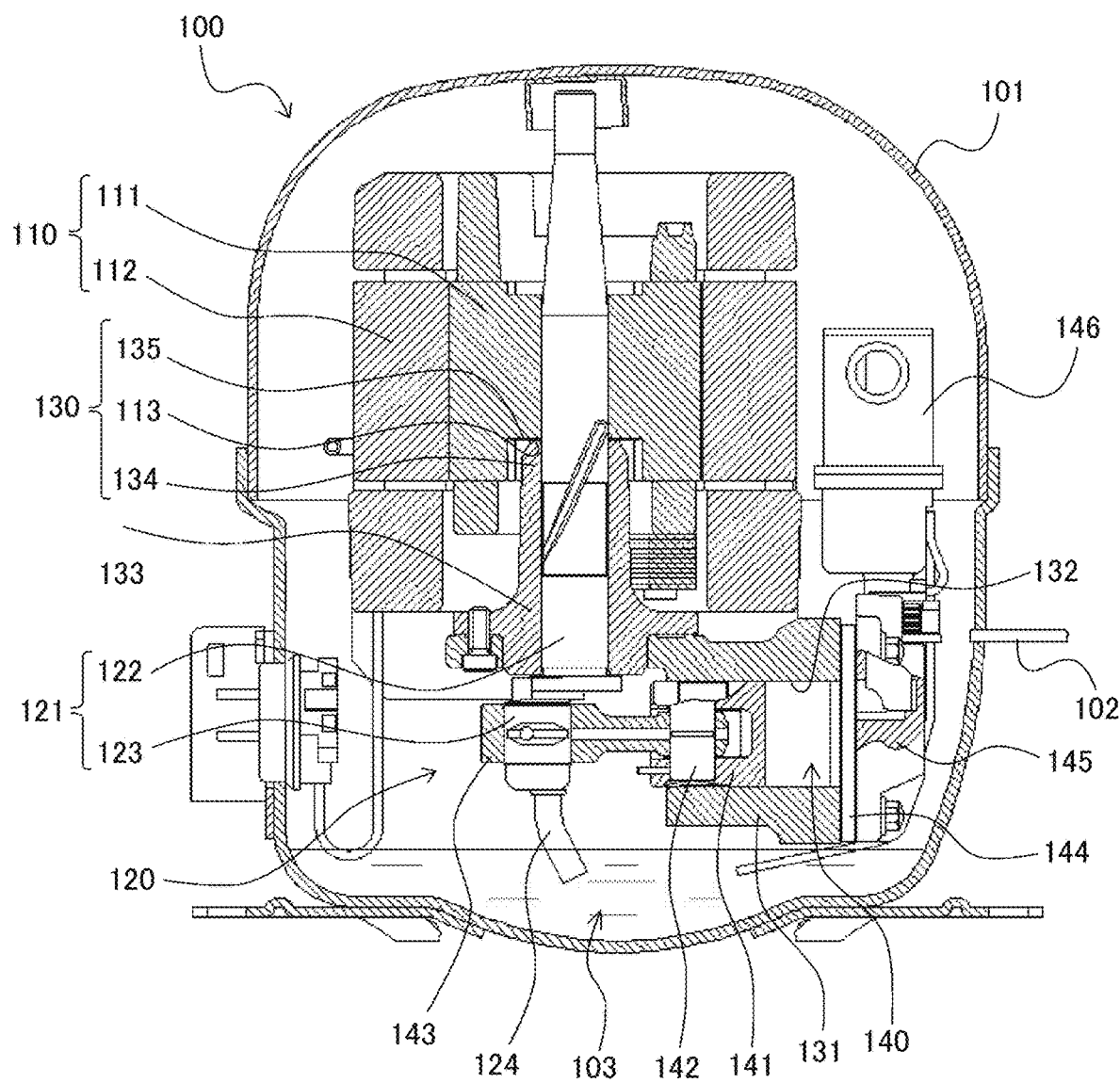
FIG. 1 is a longitudinal sectional view showing an exemplary preferred configuration of a refrigerant compressor incorporating a slide member according to a typical embodiment of the present invention.

According to the present invention, there is provided a slide member which is used in a slide unit which is included in a refrigerant compressor for compressing a refrigerant and provided inside a sealed container which reserves lubricating oil therein, the slide member comprising a base material comprising an iron based material, and an oxide coating film formed on a surface of the base material, the oxide coating film having a three-layer structure including a first layer comprising $Fe_2O_3$, a second layer comprising $Fe_3O_4$, and a third layer comprising FeO in this order from an outermost surface.

According to this configuration, since the oxide coating film has the three-layer structure of an iron oxide based material as an oxide of the base material, the adhesiveness between the layers can be improved. This can suppress abnormal phenomenon such as separation (peel-off) of the layers or adhesion of the abrasions. Therefore, the abrasion resistance of the slide member is improved, the reliability of the slide member is improved, and a sliding loss can be reduced. As a result, the refrigerant compressor including the slide member can attain a high reliability and a high efficiency.

In the slide member having the above configuration, when a thickness of the first layer is T1, a thickness of the second layer is T2, and a thickness of the third layer is T3, T1:T2:T3=5 to 20:10 to 50:30 to 85 may be satisfied.

According to this configuration, for example, by forming the oxide coating film on the sliding surface of one of the slide members constituting the slide unit, it becomes possible to mitigate the attacking characteristic of the sliding surface, i.e., attacking characteristic with respect to the sliding surface of the other slide member as the "other material". As a result, the reliability of the slide member can be improved.

In the slide member having the above configuration, the third layer may comprise FeO having an amorphous structure.

According to this configuration, since the adhesiveness between the third layer and the base material can be improved, it becomes possible to suppress the separation (peel-off) of the oxide coating film from the surface of the base material. As a result, the reliability of the slide member can be further improved.

In the slide member having the above configuration, the oxide coating film including the first layer, the second layer and the third layer may have a thickness in a range of 1 μm to 3 μm.

According to this configuration, since the thickness of the oxide coating film formed on the surface of the slide member falls within a more preferable range, the abrasion resistance can be further improved. As a result, the reliability of the slide member can be further improved.

In the slide member having the above configuration, at least the first layer may have a structure in which iron oxide particles are gathered together in a layer form; and the iron oxide particles may have a particle diameter in a range of 0.1 μm to 4.0 μm.

According to this configuration, since at least the first layer comprises the iron oxide particles in a specified range, an effective contact area of the sliding surfaces can be reduced. Since the friction coefficient of the sliding surfaces can be thus reduced, a sliding loss can be further reduced, and a sliding efficiency can be improved.

To achieve the above object, according to the present invention, there is provided a slide member which is used in a slide unit included in a refrigerant compressor for compressing a refrigerant and provided inside a sealed container which reserves lubricating oil therein, the slide member comprising on a surface of a base material, a dense oxide coating film having minute concave/convex portions with a height deference in a range of 0.01 μm to 0.1 μm.

According to this configuration, since the sliding surface has minute concave/convex portions with a nanometer level, the lubricating oil can be suctioned up well by a capillary phenomenon attributed to the concave/convex portions. This allows the slide unit to have a good retention capability of the lubricating oil. In particular, even when the lubricating oil with a low viscosity (often used in the refrigerant compressor with a higher efficiency) is used, the lubricating oil can be suctioned up and retained well. Since the abrasion resistance of the slide member is improved, the reliability of the slide member can be improved, and a sliding loss can be reduced. As a result, the refrigerant compressor including the slide member can attain a high reliability and a high efficiency.

In the slide member having the above configuration, the oxide coating film may have a structure in which oxide particles are gathered together and laid on the surface of the base material; and the oxide particles may be densely gathered together such that a spacing between tops of adjacent oxide particles is equal to or less than 4 μm.

According to this configuration, indentations are formed between the oxide particles and serve as the minute concave/convex portions. The lubricating oil is easily reserved in the indentations, and migrates out of the indentations to the sliding surface. As a result, the retention capability of the lubricating oil can be further improved, and the abrasion resistance can be further improved.

To achieve the above object, according to the present invention, there is provided a slide member which is used in a slide unit included in a refrigerant compressor for compressing a refrigerant and provided inside a sealed container which reserves lubricating oil therein, the slide member comprising a base material comprising an iron based material, and an oxide coating film formed on a surface of the base material, the oxide coating film having a three-layer structure including at least three layers which comprise iron oxides and are different in hardness.

According to this configuration, by forming the oxide coating film having the three-layer structure in which the layers comprise iron oxide based materials and are different in hardness, on the sliding surface of the slide member, a high adhesiveness with the base material can be attained. For example, by forming the oxide coating film on the sliding surface of one of the slide members constituting the slide unit, it becomes possible to mitigate the attacking characteristic of the sliding surface, i.e., attacking characteristic with respect to the sliding surface of the slide member as "the other material". Since the abrasion resistance of the slide member can be improved, the reliability of the slide member can be improved, and the sliding loss can be reduced. As a result, the refrigerant compressor including the slide member can attain a high reliability and a high efficiency.

In the slide member having the above configuration, a first layer which is an outermost surface of the three-layer structure may have a hardness which is equal to or lower than a hardness of a second layer as an intermediate layer of the three-layer structure; and a third layer located on the base material may have a hardness which is higher than a hardness of the base material and lower than the hardness of the second layer.

According to this configuration, since the hardness of the first layer is equal to or lower than that of the second layer, a compatibility (affinity) with the sliding surface of the slide member as "the other material" can be easily provided. Because of the high hardness of the second layer, the hardness of the oxide coating film can be improved. Because of the above stated hardness of the third layer, the adhesiveness between the base material and the third layer, and the adhesiveness between the third layer and the second layer can be improved. In this structure, since the first layer can reduce the friction coefficient, the attacking characteristic with respect to "the other material" can be mitigated. The second layer can improve the abrasion resistance, and the third layer can suppress the separation (peel-off) of the oxide coating film. Because of the above, since the abrasion amount of the slide member can be reduced, and the friction coefficient can be reduced, the reliability of the slide member can be improved.

In the slide member having the above configuration, the first layer may be configured such that the outermost surface has a hardness in a range of 200 Hv to 300 Hv, and a region in the vicinity of a boundary between the first layer and the second layer has a hardness in a range of 500 Hv to 600 Hv; the hardness of the second layer may be in a range of 500 Hv to 600 Hv; the hardness of the third layer may be in a range of 200 Hv to 400 Hv; and the hardness of the base material may be in a range of 100 Hv to 200 Hv.

According to this configuration, the first layer can improve a compatibility with "the other material", the intermediate layer (second layer) with a high hardness can improve the abrasion resistance, and the third layer can improve the adhesiveness between the base material and the second layer.

In the slide member having the above configuration, the first layer may have a thickness in a range of 0.01 µm to 0.3 µm; the second layer may have a thickness in a range of 0.1 µm to 0.8 µm; and the third layer may have a thickness in a range of 0.2 µm to 2.0 µm.

According to this configuration, since the thicknesses of the layers fall within the above ranges, respectively, an increase in the abrasion amount of the first layer can be suppressed, a fragile state of the second layer can be avoided, and a proper stress can be applied to the third layer. Therefore, the separation (peel-off) of the layers can be suppressed effectively, and the abrasion resistance can be improved.

To achieve the above object, according to the present invention, there is provided a refrigerant compressor comprising: a sealed container which reserves lubricating oil therein; and an electric component accommodated in the sealed container; and a compression component which is accommodated in the sealed container and activated by the electric component to compress a refrigerant; wherein the compression component includes a slide unit including the slide member according to any one of the above configurations.

According to this configuration, it becomes possible to effectively avoid a contact between the sliding surfaces of the plurality of slide members constituting the slide unit. Since a sliding loss is reduced, a loss of input to the slide unit can also be reduced. As a result, it becomes possible to achieve the high reliability and high efficiency of the refrigerant compressor.

In the refrigerant compressor having the above configuration, the compression component may include: a crankshaft including a main shaft section and an eccentric shaft; a bearing section which supports the main shaft section such that the main shaft section is rotatable; a thrust section formed in the bearing section; a cylinder block having a bore defining a compression chamber; a piston which is reciprocatable inside the compression chamber; a piston pin which is placed in parallel with the eccentric shaft and fastened to the piston; and a connecting rod for connecting the eccentric shaft to the piston; wherein the slide member may be at least one of the crankshaft, the thrust section, the bore of the cylinder block, the piston, the piston pin, and the connecting rod.

According to this configuration, at least one of the slide members constituting at least one slide unit is provided with the oxide coating film on the sliding surface thereof. This can improve the abrasion resistance of the slide member, reduce a sliding loss of the slide unit, and reduce an input loss. As a result, it becomes possible to achieve the high reliability and high efficiency of the refrigerant compressor.

In the refrigerant compressor having the above configuration, the electric component may be inverter-driven at any one of plural operating frequencies including at least an operating frequency which is equal to or lower than a power supply frequency.

According to this configuration, even when the activation speed of the compression component by the electric component is low, good sliding of the slide unit can be attained. This makes it possible to further improve the compression ability of the refrigerant compressor.

In the refrigerant compressor having the above configuration, the lubricating oil may have a viscosity in a range of VG3 to VG100. At least a natural refrigerant or a HFC based refrigerant may be used as the refrigerant compressed by the compression component.

In a case where the refrigerant is the natural refrigerant, at least one of R600a (isobutane), R290 (propane), and R744 (carbon dioxide), or a mixture of these may be used. In this case, at least one selected from a group consisting of mineral oil, ester oil, alkyl benzene oil, polyvinyl ether, and polyalkylene glycol may be used as the lubricating oil.

In a case where the refrigerant is the HFC based refrigerant, at least one of R134a, R152, R407C, R404A, R410, and R32, or a mixture of these may be used. In this case, at least one selected from a group consisting of ester oil, alkyl benzene oil, polyvinyl ether, and polyalkylene glycol may be used as the lubricating oil.

According to this configuration, by using the natural refrigerant or the HFC based refrigerant as the refrigerant gas, the abrasion resistance of the slide unit can be improved, and reliability can be improved even when the lubricating oil with a low viscosity is used. This makes it possible to further improve the compression ability of the refrigerant compressor.

The present invention also includes a refrigerator comprising the refrigerant compressor having the above configuration and an air conditioner comprising the refrigerant compressor having the above configuration.

Hereinafter, preferred embodiments of the present invention will be described reference to the drawings. Throughout the drawings, the same or corresponding components are identified by the same reference numerals and will not be descried in repetition.

[Exemplary Configuration of Refrigerant Compressor]

First of all, a typical configuration of a refrigerant compressor including a slide member of the present invention will be described, with reference to FIGS. 1 and 2. Although in the present embodiment, a reciprocating compressor which operates at a constant speed is exemplarily described as the refrigerant compressor, the present invention is not limited to this.

Figure 2:
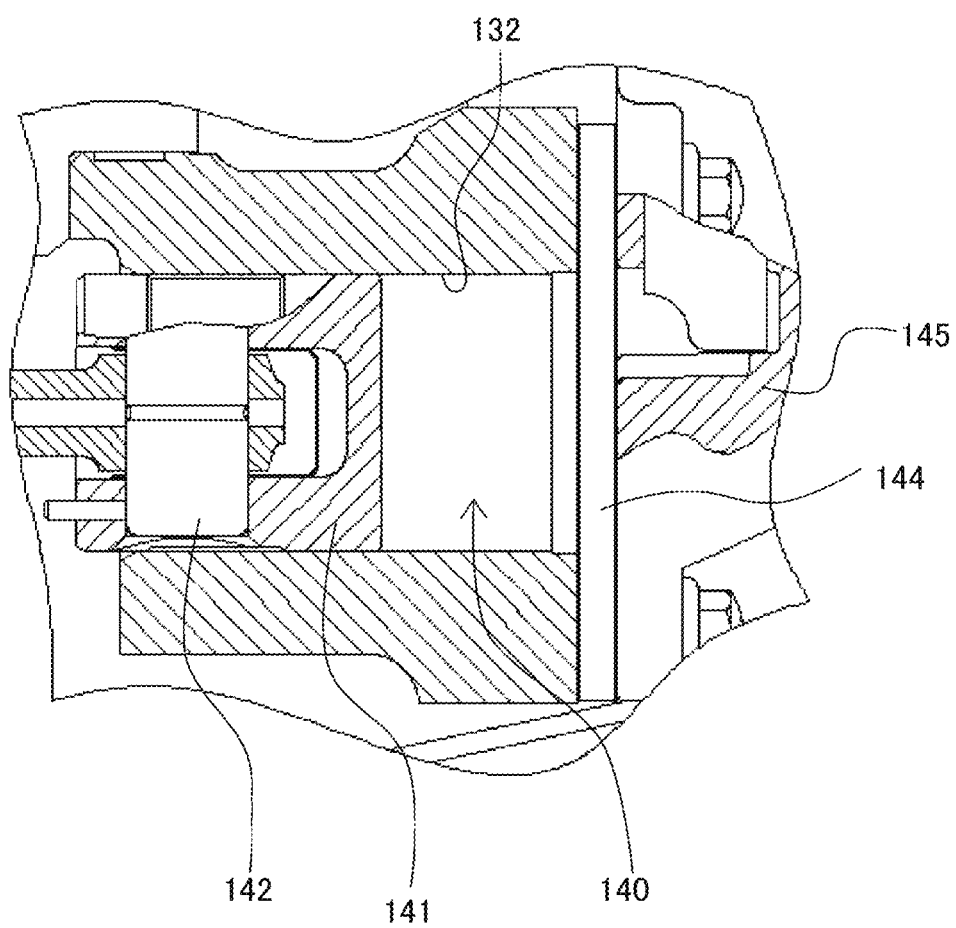
FIG. 2 is an enlarged partial cross-sectional view of a slide unit including a piston and a cylinder block in the refrigerant compressor of FIG. 1.

As shown in FIG. 1, a refrigerant compressor 100 includes a sealed container 101, an electric component 110 accommodated in the sealed container 101 and a compression component 120 accommodated in the sealed container 101. A refrigerant gas is filled into the sealed container 101 and lubricating oil 103 is filled in the bottom portion thereof. A suction pipe 102 is fastened to the sealed container 101. The suction pipe 102 is in communication with the interior of the sealed container 101 and is connected to a low-pressure side of a refrigeration cycle (not shown), to introduce the refrigerant gas into the sealed container 101.

The electric component 110 includes a stator 111 and a rotor 112 and activates the compression component 120. The stator 111 is placed at the outer periphery of the rotor 112 such that there is a gap between the stator 111 and the rotor 112. A crankshaft 121 as a fixed shaft is fastened to the rotor 112. The rotor 112 is rotatable together with the crankshaft 121 in a state in which the rotor 112 is fitted into the stator 111. The electric component 110 is preferably configured to be inverter-driven at any one of operating frequencies including at least an operating frequency which is equal to or lower than a power supply frequency.

The compression component 120 is reciprocatingly activated by the electric component 110. In the present embodiment, the compression component 120 includes the crankshaft 121, a cylinder block 131, a bearing section 133, a piston 141, a piston pin 142, a connecting rod 143, a valve plate 144, a head 145, a suction muffler 146, etc.

The crankshaft 121 includes at least a main shaft section 122 and an eccentric shaft 123, and further includes an oil feeding pump 124. The main shaft section 122 is pressed into and fixed to the rotor 112. The eccentric shaft 123 is eccentric with respect to the main shaft section 122. The oil feeding pump 124 is mounted in the eccentric shaft 123 which is the lower end of the crankshaft 121. A portion of the oil feeding pump 124 is immersed in lubricating oil 103 reserved, to feed the lubricating oil 103.

The cylinder block 131 includes a cylinder provided with a bore 132 and a bearing section 133. The cylinder having the bore 132 is fastened to the bearing section 133. The bore 132 is formed as a recess of a substantially cylindrical shape with a diameter which is substantially equal to that of the piston 141. The piston 141 is inserted into the bore 132 such that the piston 141 is extendable and retractable. As shown in FIG. 2, a compression chamber 140 is defined by the interior of the bore 132 and the piston 141. The refrigerant gas is compressed in the compression chamber 140.

The spacing (clearance) between the piston 141 and the bore 132 is not particularly limited. To reduce a leakage loss of the refrigerant gas, the spacing is set in a specified range. In general, for example, the spacing is set in a range of 5 μm to 15 μm depending on a difference in diameter.

As described above, the bearing section 133 is fastened to the cylinder block 131. The crankshaft 121 is rotatably inserted into the bearing section 133. The upper end surface of the bearing section 133 is a thrust section 134 facing the rotor 112. A flange surface 113 is provided in a portion of the rotor 112 which portion faces the thrust section 134. A thrust washer 135 is inserted into a space (interposed) between the thrust section 134 and the flange surface 113. A thrust bearing section 130 is constituted by the flange surface 113 of the rotor 112, the thrust section 134 of the bearing section 133, and the thrust washer 135.

The piston 141 inserted into the bore 132 is coupled to a connecting rod 143 via a piston pin 142. The connecting rod 143 is a coupling means coupling the piston 141 to the crankshaft 121 and is coupled to the eccentric shaft 123 of the crankshaft 121. The piston 141 is inserted at one end surface of the bore 132, while the other end surface is sealed by one surface of the valve plate 144.

A head 145 is fastened to the other surface of the valve plate 144. The head 145 is in communication with the compression chamber 140. Although not shown in FIGS. 1 and 2, a high-pressure chamber and a low-pressure chamber are formed in the interior of the head 145. A suction muffler 146 is provided between the head 145 and the valve plate 144. The suction muffler 146 is retained by the valve plate 144 and the head 145.

The specific configuration of the refrigerant compressor 100 having the above configuration is not particularly limited, and known configuration may be suitably used. In particular, the refrigerant compressor 100 includes a plurality of slide units. The slide members of the slide units typically comprise an iron based material. The "iron based material" refers to a material containing iron as a major component, and specifically refers to iron (Fe) or its alloy. Typical examples of the iron based material are cast metal (cast iron), iron based metallic ceramic (powder metallurgy), forging products, steels, etc., which are exemplary. However, the iron based material is not limited to these.

For example, as the slide unit, there are combinations of the slide members, which are a combination of the main shaft section 122 of the crankshaft 121 and the bearing section 133, a combination of the piston 141 and the bore 132 (cylinder), a combination of the thrust section 134 and the thrust washer 135, a combination of the piston pin 142 and the connecting rod 143, a combination of the eccentric shaft 123 of the crankshaft 121 and the connecting rod 143, etc. These slide members comprise the iron based material such as the cast iron.

For example, the piston 141, the cylinder block 131 constituting the bore 132, etc., are preferably made of the cast iron. Of course, the slide members are not limited to those made of the iron based material, and may comprise known other materials (e.g., aluminum based material, etc.). Therefore, an oxide coating film is not limited to an iron oxide, and other oxide may be used so long as it is the oxide of the material of the slide member (base material). The plurality of slide members of the slide unit preferably comprise the iron based materials. However, it is sufficient that at least one of the slide members comprises the iron based material.

As the lubricating oil 103 used in the refrigerant compressor 100, known lubricating oil is suitably used. Typical examples of the lubricating oil 103 are mineral oil, ester oil, alkyl benzene oil, polyvinyl ether, polyalkylene glycol, etc., may be used.

One kind of the oil material or a combination of two kinds of the oil materials may be used. Or, these oil materials may be mixed with other materials.

The physical properties of the lubricating oil 103 are not particularly limited. To improve the efficiency of the refrigerant compressor 100, its viscosity is preferably within a predetermined range. Specifically, the viscosity may be in a range of VG3 to VG100, and is preferably close to VG10.

As the refrigerant gas to be compressed in the refrigerant compressor 100, a known refrigerant may be suitably used. Specifically, for example, the refrigerant may be HFC based refrigerant such as R134a, R152, R407C, R404A, R410, or R32, natural refrigerant such as R600a (isobutane), R290 (propane), R744 (carbon dioxide), etc., HFO based refrigerant such as HFO1234yf, or HFO1234ze, a mixed refrigerant including the HFC based refrigerant, the natural refrigerant, or the HFO based refrigerant, etc., may be suitably used. Only one kind of the refrigerant selected from the above may be used, two or more kinds of the refrigerants selected from the above may be combined and used, or the above refrigerants may be combined with other refrigerants.

In a case where the HFC based refrigerant is used as the refrigerant, the mineral oil, among the above examples of the lubricating oil 103, is not used. In a case where the HFO based refrigerant is used as the refrigerant, the mineral oil, the ester oil, the alkyl benzene oil, or the polyalkylene glycol, etc., among the above examples of the lubricating oil 103, is preferably used.

[Exemplary Configuration of Slide Member]

Next, the slide member of the present invention will be described with reference to FIGS. 3 and 4, in addition to FIGS. 1 and 2.

The slide member of the present invention constitutes the slide unit included in the refrigerant compressor 100 having the above described configuration (or similar configuration). The slide unit is configured such that at least two slide members are slidable in a state in which their sliding surfaces face each other. The slide member of the present invention is at least one of the members constituting the slide unit. The sliding surface of the slide member is provided with the oxide coating film formed by oxidizing the base material.

As described above, the refrigerant compressor 100 having the above configuration includes as the slide units, a combination of the piston 141 and the bore 132, a combination of the main shaft section 122 and the bearing section 133, a combination of the thrust section 134 of the bearing section 133 and the thrust washer 135, a combination of the flange surface 113 of the rotor 112 and the thrust washer 135, a combination of the piston pin 142 and the connecting rod 143, a combination of the eccentric shaft 123 of the crankshaft 121 and the connecting rod 143, etc. In these combinations of these slide members, the sliding surface of at least one of the slide members is provided with the oxide coating film.

It is sufficient that the oxide coating film is provided on at least one of the two or more slide members constituting the slide unit. Nonetheless, the oxide coating film is preferably provided on the slide member (second slide member) which operates (moves), rather than the slide member (first slide member) which does not operate but is motionless. For example, as schematically shown in FIG. 3, in the case where the slide unit is the combination of the piston 141 and the bore 132, it is preferred that an oxide coating film 200 be provided on the sliding surface of the piston 141 which is the slide member which operates (moves), rather than the bore 132 which does not operate but is motionless. Or, although not shown, in the case where the slide unit is the combination of the main shaft section 122 of the crankshaft 121 and the bearing section 133, it is preferred that the oxide coating film 200 be provided on the sliding surface of the main shaft section 122, rather than the bearing section 133.

Next, the specific configuration of the oxide coating film 200 will be described. The oxide coating film 200 is a film of an oxide formed by oxidizing (oxidating) the base material of the slide member. As the base material of the slide member, for example, the iron based material is suitably used. In this case, the oxide coating film 200 comprises the iron oxide. Accordingly, hereinafter, the oxide coating film 200 comprising the iron oxide will be exemplarily described.

Figure 3:
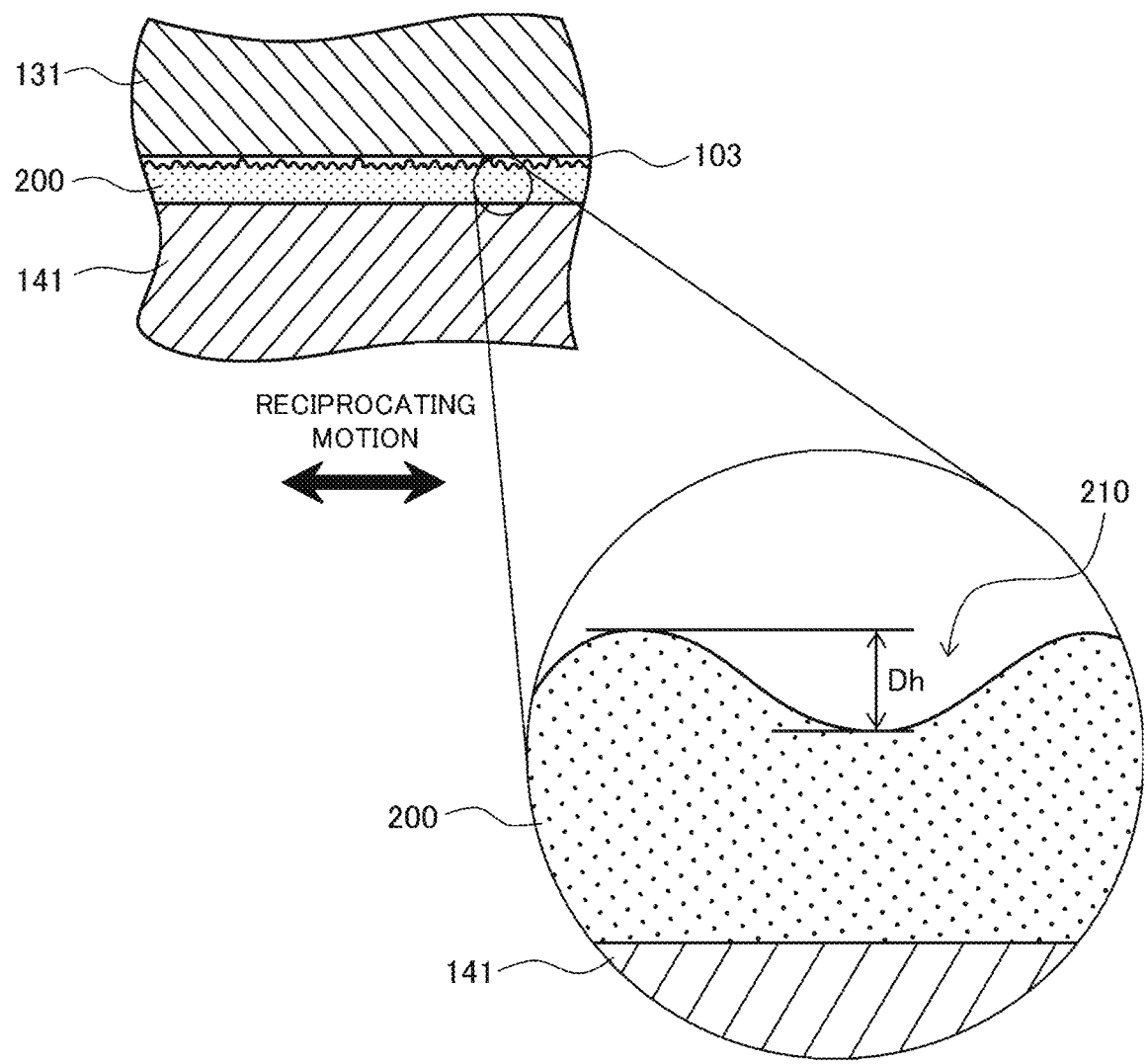
FIG. 3 is an enlarged cross-sectional view schematically showing the sliding surface of the piston and the sliding surface of the cylinder block, as an example of a slide member of the present invention, in the refrigerant compressor of FIG. 1.

As shown in FIG. 3, the oxide coating film 200 is a coating film of the iron oxide having minute unevenness (concave/convex portions) with a nanometer level on a surface thereof. Specifically, for example, the oxide coating film 200 is configured such that iron oxide particles with a particle diameter of 0.1 μm to 4.0 μm, preferably, a particle diameter which is less than 1 μm, are densely gathered together and laid on the surface of the base material. The iron oxide has a higher hardness than the metal before oxidization. Since the iron oxide particles are densely gathered together, the oxide coating film 200 can attain a high abrasion resistance.

The thickness of the oxide coating film 200 is not particularly limited and is preferably in a range of 1 μm to 3 μm. If the thickness of the oxide coating film 200 is less than 1 μm, it is too small, and the oxide coating film 200 cannot work well, while if the thickness of the oxide coating film 200 is larger than 3 μm, it is too large, and the oxide coating film 200 cannot work well. The thickness of the oxide coating film 200 can be measured by X-ray diffraction analysis or glow discharge spectroscopy. The particle diameter of the iron oxide particles and the state in which the iron oxide particles are densely gathered together can be measured or evaluated using an atomic force microscope (AFM).

Indentations 210 of the oxide coating film 200 are recesses (concave/convex portions) each of which is formed in a state in which adjacent iron oxide particles are bonded together. The depth of the indentation 210 corresponds to a height difference Dh between the top of the convex portion of the iron oxide particles and the bottom of the bonded portions of the oxide particles. The depth Dh (i.e., size of concave/convex portion) of the indentation 210 is not particularly limited, and may be in a range of 0.01 to 0.1 μm.

In the present invention, the state in which the iron oxide particles are densely gathered together refers to a state in which the spacing between the tops of the adjacent particles is equal to or less than 4 µm, preferably in a range of 0.01 to 4 µm. An aggregation of the iron oxide particles densely gathered together is the oxide coating film 200. This dense aggregation is evaluated by measuring the spacing between the tops in a longitudinal direction (X-direction) and a lateral direction (Y-direction) by using the AFM. The depth (height difference) Dh of the indentation 210 corresponds to a Z-direction.

The indentations 210 of the oxide coating film 200 serve as an oil "sump" for retaining the lubricating oil 103. As described above, the indentation 210 of the oxide coating film 200 is the recess (concave/convex portion) formed by the bonded portions of the oxide particles, and the height difference between the top (convex portion) of the iron oxide particle and the bottom of the bonded portions is equal to or less than 0.1 µm. Because of this height difference, the lubricating oil 103 is easily reserved in the indentation 210. This allows the lubricating oil 103 to be suctioned up in the space between the sliding surfaces by a capillary phenomenon attributed to the indentation 210 even when the viscosity of the lubricating oil 103 is lower than that of the conventional example. As a result, the lubricating oil 103 is retained in a blur state in the sliding surface of the slide member, and the lubricated state between the sliding surfaces can be maintained well.

If the depth (i.e., size of concave/convex portion) Dh of the indentation 210 is less than 0.01 µm, the lubricating oil 103 cannot be retained well between the sliding surfaces. In this state, it is likely that the oxide coating film 200 directly slides on the metal surface which is the sliding surface of the other slide member, a sliding loss increases, and the sliding surface of the other slide member is abraded away. On the other hand, if the depth Dh of the indentation 210 is larger than 0.1 µm, the roughness of the sliding surface increases excessively, and the friction coefficient between the sliding surfaces increases. This causes a possibility that a sliding resistance increases, or a local abrasion takes place, and thereby the sliding surface of the other slide member is damaged.

If the depth Dh of the indentation 210 is larger than 0.1 µm, a treatment such as surface lapping may be conducted to reduce the degree of the roughness of the sliding surface. However, additional treatment of grinding of the surface becomes necessary, and manufacturing cost increases. If the surface of the oxide coating film 200 is subjected to post-treatment excessively, then the degree of the unevenness (concave/convex portions) becomes too small. In this case, the lubricating oil 103 cannot be retained well, and a sliding loss is likely to increase or the other sliding surface is likely to be abraded away as described above. For this reason, the post-treatment such as the additional treatment had better be avoided.

The oxide coating film 200 of the present invention may be formed of a single (mono) layer on the surface of the slide member which is the base material. Preferably, the oxide coating film 200 is formed of a multi-layer structure. Typically, the multi-layer structure may be a three-layer structure shown in FIG. 4. As shown in FIG. 4, the oxide coating film 200 having the three-layer structure includes a first layer 201, a second layer 202, and a third layer 203 in this order from the outer surface (outermost surface) 220. When viewed from the perspective of the base material 150, the oxide coating film 200 has a structure in which the third layer 203, the second layer 202, and the first layer 201 are stacked together in this order. Although not shown in FIG. 4, the outer surface 220 of the first layer 201 has the indentations 210 (minute concave/convex portions) as described above.

Preferably, these layers may be different in hardness from each other, these layers may comprise different oxides, respectively, or these layers may be different in hardness from each other and comprise different oxides.

Firstly, a case where the layers are different in hardness will be described. Preferably, the hardness of the first layer 201 is equal to or lower than that of the second layer 202, and the hardness of the third layer 203 is higher than that of the base material 150 and lower than that of the second layer 202 (hardness of the third layer 203 is an intermediate value between the hardness of the base material 150 and the hardness of the second layer 202).

Specifically, a preferable example of the hardness is such that the hardness of the outermost surface (outer surface 220) of the first layer 201 is in a range of 200 Hv to 300 Hv, the hardness distribution of a region in the vicinity of the boundary between the first layer 201 and the second layer 202 is in a range of 500 Hv to 600 Hv, the hardness of the second layer 202 is in a range of 500 Hv to 600 Hv, the hardness of the third layer 203 is in a range of 200 Hv to 400 Hv, and the hardness of the base material 150 is in a range of 100 Hv to 200 Hv. In particular, the hardness distribution of the first layer 201 is preferably such that the hardness increases from the outermost surface toward the center of the cross-section of the slide member, and is almost equal to that of the second layer 202 in the region in the vicinity of the boundary with the second layer 202.

In the present invention, the hardness of each layer and of the base material 150 is measured based on a Vickers hardness test-test method defined in JIS Z2244.

When the hardness of the layers fall within the above ranges, respectively, the adhesiveness between the layers constituting the oxide coating film 200 can be improved, and the attacking characteristic of the oxide coating film 200 (one of the sliding surfaces) with respect to the other sliding surface can be mitigated. If one of the sliding surfaces attacks the other sliding surface, the other sliding surface may be easily abraded away, and a portion of the surface (first layer 201) may also be abraded away. In this case, the resulting abrasions adhere to the sliding surfaces, and an abnormal abrasion may occur on at least one of the sliding surfaces. For this reason, the mitigation of the attacking characteristic of the oxide coating film 200 can improve the abrasion resistance and effectively suppress the abnormal abrasion of each of the sliding surfaces.

Specifically, since the hardness of the first layer 201 is equal to or lower than that of the second layer 202 and the hardness of the outermost surface (outer surface 220) of the first layer 201 falls within the above range, the outermost surface (outer surface 220) of the first layer 201 has a high compatibility with the other sliding surface. This can reduce the friction coefficient between the sliding surfaces. Thus, a loss of input to the refrigerant compressor 100 can be reduced, and hence the efficiency of the refrigerant compressor 100 can be improved. In addition, since the hardness of the second layer 202 which is an intermediate layer is high, the abrasion resistance of the whole oxide coating film 200 can be improved. Furthermore, since the hardness of the third layer 203 is higher than that of the base material 150 and lower than that of the second layer 202, the adhesiveness between the third layer 203 and the second layer 202, and the adhesiveness between the third layer 203 and the base material 150, can be improved.

The thickness of each of the layers is not particularly limited. A preferable example is such that the thickness of the first layer 201 is in a range of 0.01 µm to 0.3 µm, the thickness of the second layer 202 is in a range of 0.1 µm to 0.8 µm, and the thickness of the third layer 203 is in a range of 0.2 µm to 2.0 µm. As defined herein, the region in the vicinity of the boundary between the first layer 201 and the second layer 202 refers to a region which is within a range of ±0.1 µm from the boundary between the first layer 201 and the second layer 202. As in the thickness of the oxide coating film 200, the thickness of each of the layers can be measured by the X-ray diffraction analysis or the glow discharge spectroscopy.

In the present invention, the thickness of each of the layers may fall outside the above range. However, in a case where the slide member (second slide member) provided with the oxide coating film 200 comprises the metal based material (therefore, the oxide coating film 200 also comprises the iron oxide), and the other slide member (first slide member) comprises the metal based material, the thickness of each of the layers preferably falls within the above range.

Specifically, if the thickness of the first layer 201 is larger than 0.3 µm, then the amount of an abrasion of the sliding surface of the other slide member increases and hence its abrasion powder increases. Thereby, the abrasion resistance of the other sliding surface may be degraded. On the other hand, if the thickness of the first layer 201 is smaller than 0.01 µm, then a compatibility between the sliding surfaces may be degraded. In this case, the second layer 202 is likely to attack the other sliding surface, which causes a possibility that the other sliding surface is more abraded away.

If the thickness of the second layer 202 is larger than 0.8 µm, the second layer 202 may sometimes get frazil. If the second layer 202 gets frazil, it is easily separated (peeled-off) or broken, and as a result, the surface of the second layer 202 is roughened. The roughened surface is likely to damage the other sliding surface, and thus an abnormal abrasion is likely to occur in the other sliding surface. On the other hand, if the thickness of the second layer 202 is smaller than 0.1 µm, the abrasion resistance of the second layer 202 may be reduced.

If the thickness of the third layer 203 is larger than 2.0 µm, a stress applied to the second layer 202 and the third layer 203 tends to increase during the sliding. In some cases, the second layer 202 and the third layer 203 may be separated away from each other. On the other hand, if the thickness of the third layer 203 is smaller than 0.2 µm, a residual stress at a time point of formation of the third layer 203, tends to concentrate in a region between the second layer 202 and the third layer 203, or in a region between the third layer 203 and the base material 150. This may cause the second layer 202 and the third layer 203 to be separated away from each other, or the third layer 203 and the base material 150 to be separated away from each other.

Next, a case where the layers comprise different oxides will be described. For example, the first layer 201 may comprise $Fe_2O_3$, the second layer 202 may comprise $Fe_3O_4$, and the third layer 203 may comprise FeO. The component of the iron oxide of each of the layers can be analyzed by the X-ray diffraction analysis or glow discharge spectroscopy, which is used in the measurement of the thickness of each of the layers. Alternatively, an iron hydroxide layer may be formed on the outer surface (outermost surface) 220 (i.e., on the first layer 201). Therefore, it is sufficient that the oxide coating film 200 has a three-layer structure including at least the first layer 201, the second layer 202 and the third layer 203, but the oxide coating film may have a multi-layer structure of four or more layers.

The thickness of each of the layers is not particularly limited. The thickness of each of the layers in a case where the layers are different in hardness may be used. In particular, when the thickness of the first layer 201 is T1, the thickness of the second layer 202 is T2, and the thickness of the third layer 203 is T3, T1:T2:T3=5 to 20:10 to 50:30 to 85 is preferably satisfied.

The structure of the iron oxide constituting each layer is not particularly limited, and may be a general polycrystalline structure. FeO constituting the third layer 203 has preferably an amorphous structure. If the third layer 203 has the amorphous structure, the adhesiveness between the base material 150 and the third layer 203 can be improved, and hence reliability of the oxide coating film 200 can be improved.

The oxide coating film 200 having the three-layer structure allows the oxide coating film 200 to have better physical properties than in the case where the oxide coating film 200 has a single-layer structure. In particular, in a case where the oxide coating film 200 is composed of different oxides which are different in hardness, it can have much better physical properties.

In brief, the outermost surface can have a high compatibility with the other sliding surface and the friction coefficient with respect to the other sliding surface can be reduced, irrespective of whether the layers are different in hardness or comprise different iron oxides. This allows the slide unit to slide more smoothly. In addition, the intermediate layer can improve the abrasion resistance, while the lowermost layer can improve the adhesiveness with the intermediate layer and with the base material. Although all of the layers comprise different iron oxides, an affinity (a compatibility) between the layers is high, and the adhesiveness between the layers can be improved. This can avoid an abnormality such as separation of the layers, and lessen a possibility of a situation in which an abnormal friction occurs in the other sliding surface. As a result, reliability of the slide member can be improved.

A formation method of the oxide coating film 200 of the present invention is not particularly limited. A known oxidization method may be suitably used according to conditions such as the quality of the base material, the dimension of the slide member, the shape of the slide member, or the state of the sliding surface. Specifically, in the case where the base material (slide member) is the iron based material, the oxide coating film 200 can be formed by heating and oxidizing the slide member in a range of about 400 to 600 degrees C. in a known oxidization medium.

In the case where the base material is the iron based material, the oxide coating film 200 may be formed after a known surface treatment is conducted on the sliding surface (surface to be provided with the oxide coating film 200). As an example of the surface treatment, for example, shot peening, barrel polishing, etc., may be used. However, the surface treatment is not limited to these.

By appropriately setting the conditions such as the kind of the oxidization medium, the concentration of the oxidization medium, the heating temperature of the slide member (and oxidization medium), a change in the heating temperature which occurs with time, and the kind of a heating means, it becomes possible to form the iron oxide coating film having the single-layer structure or the three-layer structure (or other multi-layer structure) as the oxide coating film 200. For example, to allow the FeO layer which is the third layer 203 to have the amorphous structure, the heating temperature may be set relatively lower. For example, in a case where the oxide coating film is formed by heating the base material up to 550 degrees C. in an oxidization medium atmosphere, the FeO layer can be formed as the amorphous layer, by suppressing heating of the third layer 203 to 480 degrees C. In a case where the base material is a material other than the iron based material, the oxidization may be carried out under the conditions set appropriately according to the kind of the material.

[Exemplary Operation of Refrigerant Compressor]

Next, the operation of the refrigerant compressor 100 configured as described above, incorporating the slide member including the oxide coating film 200 having the above configuration, will be specifically described with reference to FIGS. 1 and 2.

Initially, electric power is supplied from a power supply utility (not shown) to the electric component 110, to rotate the rotor 112 of the electric component 110. Since the rotor 112 rotates the crankshaft 121, the eccentric shaft 123 rotates according to the rotation of the main shaft section 122. The eccentric motion of the eccentric shaft 123 with respect to the main shaft section 122 is transmitted from the connecting rod 143 to the piston 141 via the piston pin 142. As a result, the piston 141 reciprocates within the bore 132.

According to the reciprocation motion of the piston 141, the refrigerant gas is introduced from the refrigerant cycle (not shown) into the sealed container 101 through the suction pipe 102. The refrigerant gas is suctioned from the suction muffler 146 into a space defined by the interior of the bore 132 and the piston 141, i.e., compression chamber 140, and compressed therein. The refrigerant gas compressed in the compression chamber 140 is discharged to the refrigeration cycle (not shown) through the discharge pipe (not shown). The refrigerant gas is circulated within the refrigeration cycle, and is introduced again into the sealed container 101 through the suction pipe 102.

According to the rotation of the crankshaft 121, the oil feeding pump 124 operates. The oil feeding pump 124 suctions up the lubricating oil 103 reserved in the bottom portion of the sealed container 101 and feeds the lubricating oil 103 to each of the plurality of slide units. This allows the slide units to be lubricated by the lubricating oil 103. The lubricating oil 103 also serves as a seal, for example, between the bore 132 and the piston 141.

Figure 4:
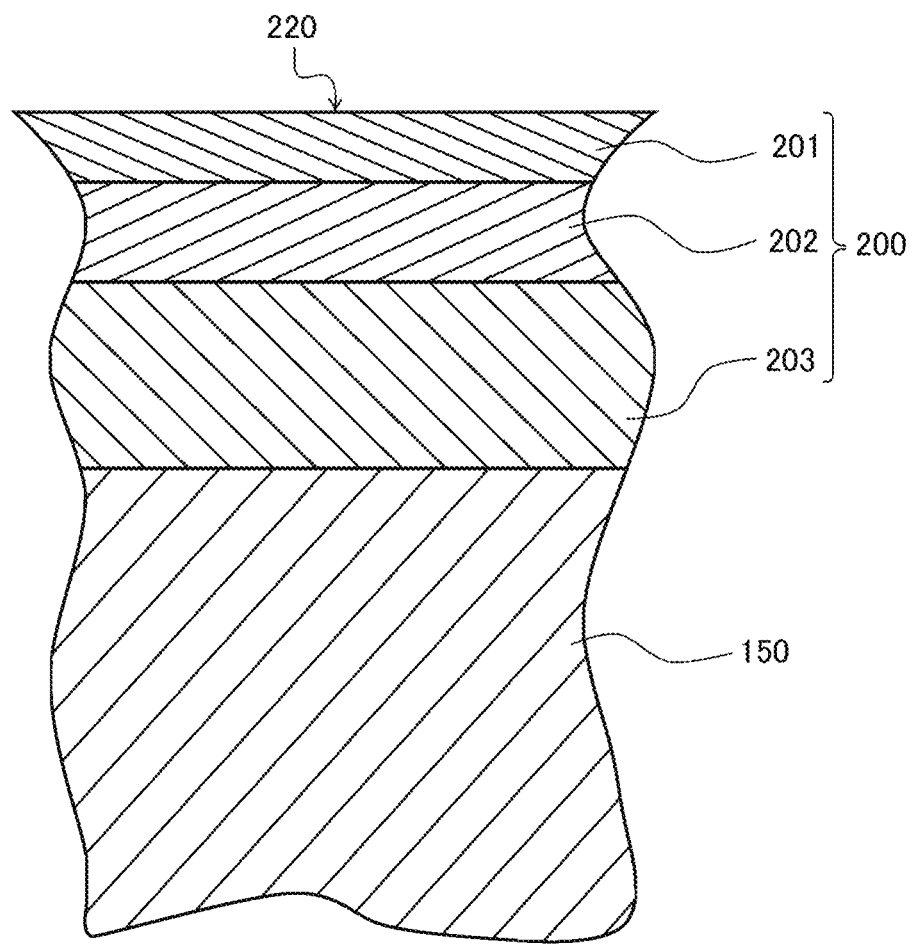
FIG. 4 is an enlarged cross-sectional view schematically showing the surface (sliding surface) of a crankshaft, as an example of the slide member of the present invention, in the refrigerant compressor of FIG. 1.

In the present embodiment, in the slide unit including the piston 141 and the bore 132, and the slide unit including the main shaft section 122 of the crankshaft 121 and the bearing section 133, among the plurality of slide units, the sliding surface of the piston 141 or the main shaft section 122, which is one of the slide members, is provided with the above mentioned oxide coating film 200 (see FIGS. 3 and 4).

For example, in the slide unit including the piston 141 and the bore 132, the clearance between the bore 132, and the piston 141 reciprocating inside the bore 132, is set to a very small value. Because of this, depending on the conditions such as the shape of the piston 141, the shape of the bore 132, or non-uniformity of accuracy of them, their sliding surfaces may partially contact each other. In particular, in the reciprocating refrigerant compressor 100 shown in FIG. 1, when the piston 141 is located at a top dead center or the bottom dead center, the velocity of the piston 141 becomes zero. Therefore, logically, no oil pressure is generated, and no oil film of the lubricating oil 103 is formed. Therefore, in many cases, the sliding surfaces contact each other when the piston 141 reaches the top dead center or the bottom dead center.

For example, when the piston 141 is located in the vicinity of the top dead center, the piston 141 receives a great compressive load from a high-pressure refrigerant gas compressed. This compressive load is transmitted to the crankshaft 121 via the piston pin 142 and the connecting rod 143. This causes the crankshaft 121 to be tilted in a direction opposite to the moving direction of the piston 141. When the crankshaft 121 is tilted, the piston 141 is tilted inside the bore 132. As a result, the sliding surface of the piston 141 partially contacts the sliding surface of the bore 132.

In the slide unit including the main shaft section 122 of the crankshaft 121 and the bearing section 133, a load applied to the main shaft section 122 changes significantly due to a gas pressure of the refrigerant gas compressed in the compression chamber 140. This causes a possibility that the refrigerant gas dissolved into the lubricating oil 103 is formed into bubbles repeatedly between the main shaft section 122 of the crankshaft 121 and the bearing section 133. With an increase in the efficiency of the refrigerant compressor 100, the spacing (clearance) between the main shaft section 122 and the bearing section 133 is decreased. Therefore, the frequency with which a partial contact between the sliding surfaces occurs increases.

In a case where the viscosity of the lubricating oil 103 is low, the amount of the lubricating oil 103 retained between the sliding surfaces tends to be less when the refrigerant compressor 100 is stopped. For this reason, just after the refrigerant compressor 100 is activated, the frequency with which a partial contact between the sliding surfaces occurs increases.

When the sliding surfaces of the slide units easily contact each other, the sliding surfaces are abraded. Therefore, the reliability of the slide units is degraded, and a sliding loss is more likely to be generated in the slide units. As a result, the reliability of the refrigerant compressor 100 including this slide unit degrades, or its efficiency cannot be increased.

To avoid this, in the present embodiment, the sliding surface of the piston 141 or the sliding surface of the main shaft section 122 of the crankshaft 121 is provided with the above described oxide coating film 200. Therefore, it becomes possible to effectively avoid a contact between the metal surfaces of the sliding surfaces. In addition, since the spacing (clearance) between the piston 141 and the bore 132, or the spacing between the main shaft section 122 and the bearing section 133 is small, the lubricating oil 103 is sufficiently fed thereto by the action of a surface tension. In addition, because of the high ability of the oxide coating film 200 to retain the lubricating oil 103, the lubricating oil 103 is stably retained between the sliding surfaces.

Therefore, in these slide units, a fluid is always filled between the sliding surfaces to lubricate them, and hence the sliding surfaces are less likely to be abraded. Since a high abrasion resistance in the slide units can be realized in this way, the reliability of the slide units can be improved, and the sliding loss can be reduced. As a result, it becomes possible to provide the refrigerant compressor 100 with a high efficiency and a high reliability.

In the slide unit between the piston 141 and the bore 132, the lubricating oil 103 performs a high sealing function between the sliding surfaces. This makes it possible to effectively suppress the refrigerant gas compressed in the compression chamber 140 from leaking from the spacing (clearance) between the piston 141 and the bore 132. Therefore, a high abrasion resistance between the piston 141 and the bore 132 can be attained, and even the lubricating oil 103 with a low velocity can be retained well. Thus, the refrigerant gas can be compressed efficiently. As a result, it becomes possible to provide the refrigerant compressor 100 with a high efficiency and a high reliability.

The slide member of the present invention may comprise one of the following configurations (1) to (3): (1) the base material 150 comprises the iron based material, and the oxide coating film 200 having the three-layer structure including the first layer 201 comprising $Fe_2O_3$, the second layer 202 comprising $Fe_3O_4$, and the third layer 203 comprising FeO is formed on the surface of the base material 150 in this order from the outermost surface, (2) the dense oxide coating film 200 having minute concave/convex portions (e.g., indentations 210) with a height difference which falls within a range of 0.01 µm to 0.1 µm is formed on the surface of the base material 150, and (3) the base material 150 comprises the iron based material, and the oxide coating film 200 having the three-layer structure in which the three layers comprise the iron oxides and are different in hardness is formed on the surface of the base material 150. The slide member of the present invention may comprise two of the above configurations (1) to (3) or all of the above configurations (1) to (3).

By forming the oxide coating film 200 having the above configuration on the sliding surface, it becomes possible to attain the slide member with a high reliability. By incorporating the slide member into the slide unit, the efficiency and reliability of the refrigerant compressor 100 can be improved.

[Exemplary Application of Refrigerant Compressor]

As described above, the slide member of the present invention is widely suitably used in the slide units of the refrigerant compressor 100. The refrigerant compressor 100 of the present invention, incorporating the slide member, is widely suitably applied to refrigeration cycles or devices having substantially the same configuration. Specifically, for example, the refrigerant compressor 100 may be applied to refrigerators (for household use, for business use), dehumidifiers, show cases, ice making machines, heat pump hot water storage machine, heat pump laundry driers, automatic dispensers, air conditioner, etc., which are merely exemplary. However, the refrigeration cycles or devices are not limited to these.

Now, a refrigerator will be exemplarily described as a typical application of the refrigerant compressor 100 of the present invention. Specifically, for example, as schematically shown in the block diagram of FIG. 5A, a refrigerator 160 of the present embodiment includes the refrigerant compressor 100 of FIG. 1, a condenser 161, a pressure-reducing unit 162, an evaporator 163, a pipe 164, etc. The refrigerator 160 further includes a casing which is a refrigerator body, a blower, an operation section, a control section, etc., which are not shown.

The refrigerant compressor 100 has the above described configuration, and compresses the refrigerant gas to generate a high-temperature and high-pressure gaseous refrigerant. The condenser 161 cools the refrigerant to obtain a liquefied refrigerant. The pressure-reducing unit 162 is constituted by, for example, a capillary tube, and reduces the pressure of the liquefied refrigerant (liquid refrigerant). The evaporator 163 evaporates the refrigerant to generate a low-temperature and low-pressure gaseous refrigerant. The refrigerant compressor 100, the condenser 161, the pressure-reducing unit 162, and the evaporator 163 are connected together in this order in an annular form, via the pipe 164 through which the refrigerant gas flows, thereby forming the refrigeration cycle.

The configurations of the condenser 161, the pressure-reducing unit 162, the evaporator 163, the pipe 164, the body casing, the blower, the operation section, the control section, etc., are not particularly limited, and known configurations may be suitably used. The refrigerator 160 may include constituents in addition to the above.

Figure 5A:
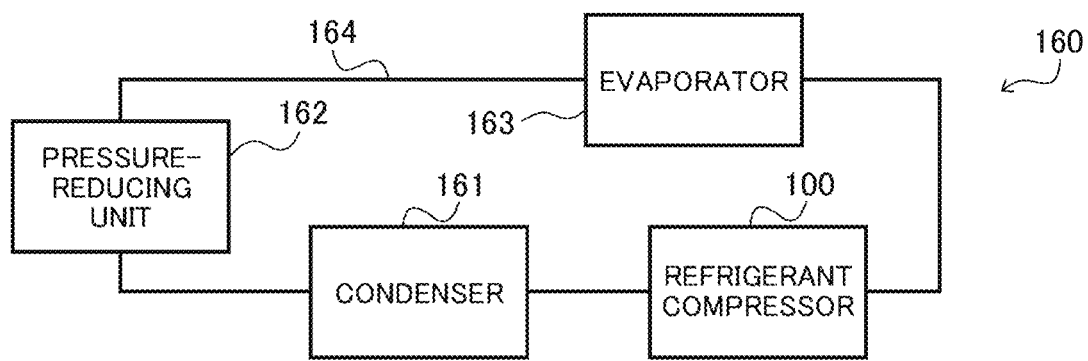
FIG. 5A is a block diagram showing a typical example of a refrigerator including the refrigerant compressor of FIG. 1.

The exemplary operation of the refrigerator 160 of FIG. 5A will be specifically described. The refrigerant compressor 100 compresses the gaseous refrigerant and discharges the compressed gaseous refrigerant to the condenser 161. The condenser 161 cools the gaseous refrigerant to generate the liquid refrigerant. The liquid refrigerant is reduced by pressure in the pressure-reducing unit 162, and sent to the evaporator 163. In the evaporator 163, the liquid refrigerant deprives heat from its surrounding region and is changed into the gaseous refrigerant. The gaseous refrigerant is returned to the refrigerant compressor 100. The refrigerant compressor 100 compresses the gaseous refrigerant and discharges the compressed gaseous refrigerant to the condenser 161 again.

Next, an air conditioner will be exemplarily described as another typical application of the refrigerant compressor 100 of the present invention. For example, as schematically shown in the block diagram of FIG. 5B, an air conditioner 170 of the present invention includes an indoor unit 171, an outdoor unit 172 and a pipe 176 connecting the indoor unit 171 and the outdoor unit 172 to each other. The indoor unit 171 includes a heat exchanger 173, while the outdoor unit 172 includes a heat exchanger 174 and the refrigerant compressor 100 of FIG. 1.

The heat exchanger 173 of the indoor unit 171 and the heat exchanger 174 of the outdoor unit 172 are connected to each other in an annular form by the pipe 176, thereby forming the refrigeration cycle. The pipe 176 connecting the heat exchanger 173 to the heat exchanger 174 is provided with a four-way valve 175 for switching between cooling and heating. The indoor unit 171 includes a blower fan, a temperature sensor, an operation section, etc., which are not shown, while the outdoor unit 172 includes a blower, an accumulator, etc., which are not shown. The pipe 176 is provided with devices (not shown) (including four-way valve 175), a strainer (not shown), etc.

The heat exchanger 173 of the indoor unit 171 exchanges heat between indoor air suctioned into the indoor unit 171 by the blower fan and the refrigerant flowing in the interior of the heat exchanger 173. During the heating, the indoor unit 171 sends the air heated by heat exchange to an indoor area, while during the cooling, the indoor unit 171 sends the air cooled by heat exchange to the indoor area. The heat exchanger 174 of the outdoor unit 172 exchanges heat between outdoor air suctioned into the outdoor unit 172 by the blower and the refrigerant flowing in the interior of the heat exchanger 174.

The specific configurations of the indoor unit 171 and the outdoor unit 172, or the specific configurations of the heat exchanger 173, the heat exchanger 174, the four-way valve 175, the blower fan, the temperature sensor, the operation section, the blower, the accumulator, other valve devices, the strainer, etc., are not particularly limited, and known configurations may be used.

Figure 5B:
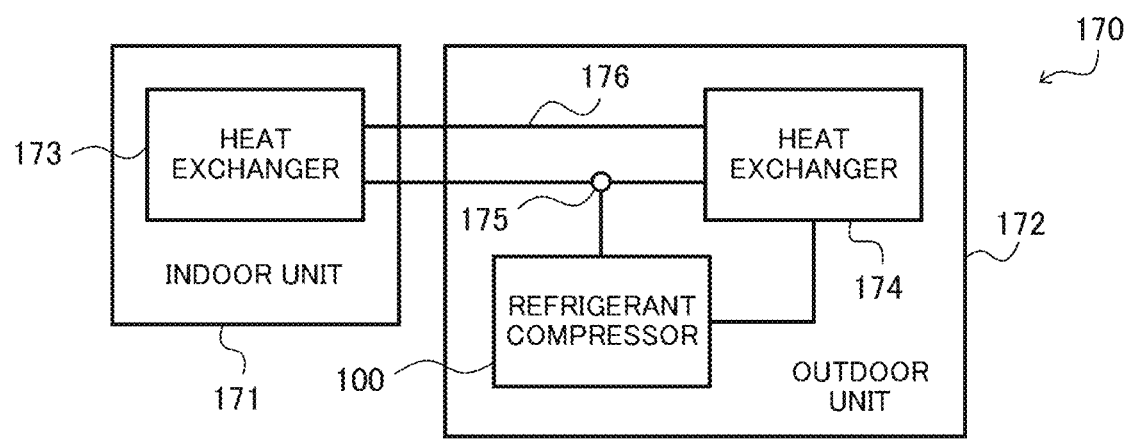
FIG. 5B is a block diagram showing a typical example of an air conditioner including the refrigerant compressor of FIG. 1.

The exemplary operation of the air conditioner 170 of FIG. 5B will be specifically described. In a cooling operation or in a dehumidification operation, the refrigerant compressor 100 of the outdoor unit 172 compresses and discharges the gaseous refrigerant. The gaseous refrigerant is sent out to the heat exchanger 174 of the outdoor unit 172 via the four-way valve 175. The heat exchanger 174 exchanges heat between the outdoor air and the gaseous refrigerant, so that the gaseous refrigerant is condensed into the liquid refrigerant. The liquid refrigerant is reduced in pressure, and sent out to the heat exchanger 173 of the indoor unit 171. In the heat exchanger 173, the liquid refrigerant is evaporated into the gaseous refrigerant by heat exchange with the indoor air. This gaseous refrigerant is returned to the refrigerant compressor 100 of the outdoor unit 172 via the four-way valve 175. The refrigerant compressor 100 compresses the gaseous refrigerant and discharges the compressed gaseous refrigerant to the heat exchanger 174 again via the four-way valve 175.

In a heating operation, the refrigerant compressor 100 of the outdoor unit 172 compresses and discharges the gaseous refrigerant. The gaseous refrigerant is sent out to the heat exchanger 173 of the indoor unit 171 via the four-way valve 175. The heat exchanger 173 exchanges heat between the indoor air and the gaseous refrigerant, so that the gaseous refrigerant is condensed into the liquid refrigerant. The liquid refrigerant is reduced in pressure by the pressure-reducing valve (not shown) and changed into a gas-liquid two-phase refrigerant, which is sent out to the heat exchanger 174 of the outdoor unit 172. The heat exchanger 174 exchanges heat between the outdoor air and the gas-liquid two-phase refrigerant, so that the gas-liquid two-phase refrigerant is evaporated into the gaseous refrigerant, which is returned to the refrigerant compressor 100. The refrigerant compressor 100 compresses the gaseous refrigerant and discharges the compressed gaseous refrigerant to the heat exchanger 173 of the indoor unit 171 again via the four-way valve 175.

The refrigerator 160 or the air conditioner 170 includes the refrigerant compressor 100 having the above described configuration. As described above, the refrigerant compressor 100 includes the slide member provided with the oxide coating film 200 on the sliding surface thereof and the slide unit including this slide member. Because of this, the refrigerant compressor 100 can achieve a high efficiency and a high reliability. The refrigerator 160 or the air conditioner 170 including the refrigerant compressor 100 can achieve a high efficiency and a high reliability as well.

Modified Example

Although in the present embodiment, the slide unit including the piston 141 and the bore 132, and the slide unit including the main shaft section 122 of the crankshaft 121 and the bearing section 133 are exemplarily described as the slide unit provided with the oxide coating film 200 on the sliding surface thereof, the present invention is not limited to this. The present invention can also be applied in the same manner to other slide units including other slide members, such as the slide unit including the thrust section 134 of the bearing section 133 and the thrust washer 135, the slide unit including the flange surface 113 of the rotor 112 and the trust washer 135, the slide unit including the piston pin 142 and the connecting rod 143, or the slide unit including the eccentric shaft 123 of the crankshaft 121 and the connecting rod 143.

For example, as in the case of the slide unit including the main shaft section 122 and the bearing section 133, in the slide unit including the eccentric shaft 123 of the crankshaft 121 and the connecting rod 143, there may be a possibility that the refrigerant gas dissolved into the lubricating oil 103 is formed into bubbles repeatedly between the sliding surfaces, due to a great change in the load applied to the eccentric shaft 123. By forming the oxide coating film 200 on the sliding surface of the eccentric shaft 123, a high abrasion resistance of the slide unit can be realized.

Although in the present embodiment, the refrigerant compressor 100 is a reciprocating refrigerant compressor which moves at a constant speed, the present invention is not limited to this, and is applicable to other compressors including the slide units, such as a scroll refrigerant compressor, a rotary refrigerant compressor, or a vibrational refrigerant compressor. Moreover, the present invention is suitably applicable, in particular, to a compressor which performs a motion at a super-low velocity (lower than 20 Hz), with a reduction of the velocity of the compressor due to the use of the inverter.

Commonly, as the material of the slide members of the compressor, gray cast iron such as FC200 or FC250 is chosen. In this case, there is a great variation in particle diameter of the iron oxide particles of the oxide coating film 200. In this case, the treatment conditions used to form the oxide coating film 200 are preferably decided so that the depth (height difference in minute concave/convex portions) Dh of the indentations 210 of the oxide coating film 200 falls within a range of 0.02 µm to 0.08 µm. This can equalize a quality in industrial mass production which takes a variation into account.

EXAMPLES

Examples and comparative examples of the present invention will be described in more detail. However, the present invention is not limited to these. Those skilled in the art can change, modify, or alter the examples in various ways without departing from the scope of the invention. Measurement or evaluation of the physical properties in examples and comparative examples were conducted as described below.

(Measurement Method or Evaluation Method)

[Evaluation of Density of Oxide Coating Film]

The spacings between the tops of the oxide coating film in the longitudinal direction (X-direction) and lateral direction (Y-direction) were measured and evaluated by a nano indentation device, TI-950, Triboindenter (product name) manufactured by Hysitron Inc.

[Measurement and Analysis of Thickness of Oxide Coating Film: X-Ray Diffraction (XRD) Analysis]

The thickness of the oxide coating film was measured using a X-ray diffraction device X' Pert PRO MPD (product name), manufactured by PANalytical B.V. under conditions (radiation source: X-ray mirror, slit: ½ degrees, mask: 10 µm, detector: Xe proportional detector, tube: Cu, voltage: 45 kV, current: 40 mA).

[Measurement and Analysis of Thickness of Oxide Coating Film: Glow Discharge Spectroscopy (GDS)]

The thickness of the oxide coating film was measured using glow discharge optical emission spectroscopy (GD-OES), GD-PROFILER2 (product name), manufactured by HORIBA, Ltd. (JOBIN YVON S.A.S. Co.), under conditions of current method program: Fe-matrix-21P-0, constant electric power: 35 W, Ar-pressure: 600 Pa, discharge mode: normal sputtering, discharge range: 4 mmφ, analytical elements: 17 elements which are O, Fe, H, Si, Mn, Cr, Cu, Ni, Al, Ti, Co, C, N, Ca, Na, S, P, analysis time: 250 seconds, sampling time: 0.1 second/point).

[Measurement of Particle Diameter of Iron Oxide Particles on Surface]

The size of the iron oxide particles located on the surface of the oxide coating film was measured by the nano indentation device, TI-950, Triboindenter (product name) manufactured by Hysitron Inc.

[Measurement of Vickers Hardness]

Vickers hardness of each of the first to third layers of the oxide coating film and the base layer was measured based on JS Z2244 by the nano indentation device, TI-950, Triboindenter (product name) manufactured by Hysitron Inc. In this measurement, indentation load and depth of a probe were measured successively, and a result of measurement of hardness by a nano indentation method (method of calculating indentation hardness or Yong modulus based on a curve of an indentation depth and a load) was converted into Vickers hardness.

[Evaluation of Oxide Coating Film by Ring on Disc Abrasion Test]

The ring on disc abrasion test of the oxide coating film was conducted using a medium pressure CFC friction abrasion tester, AFT-18-200M (product name) manufactured by A&D Co., Ltd., under conditions (load: 1000N).

Example 1

A round rod made of cast iron was prepared as a base material which simulated a piston, and the surface of the base material was activated by a surface treatment. Then, the base material was heated up to 550 degrees C. in a heat buildup converted gas (DX gas) and then cooled. This resulted in the sample of Example 1, that is, the base material provided with the oxide coating film on the surface thereof The thickness of the oxide coating film formed on the sample was measured, and the depth of the indentations (size of the concave/convex portions) on the surface was measured. The depth of one indentation on the surface of the oxide coating film was measured and was, for example, Dh=25 nm (0.025 µm) as shown in FIG. 6A.

Figure 6A:
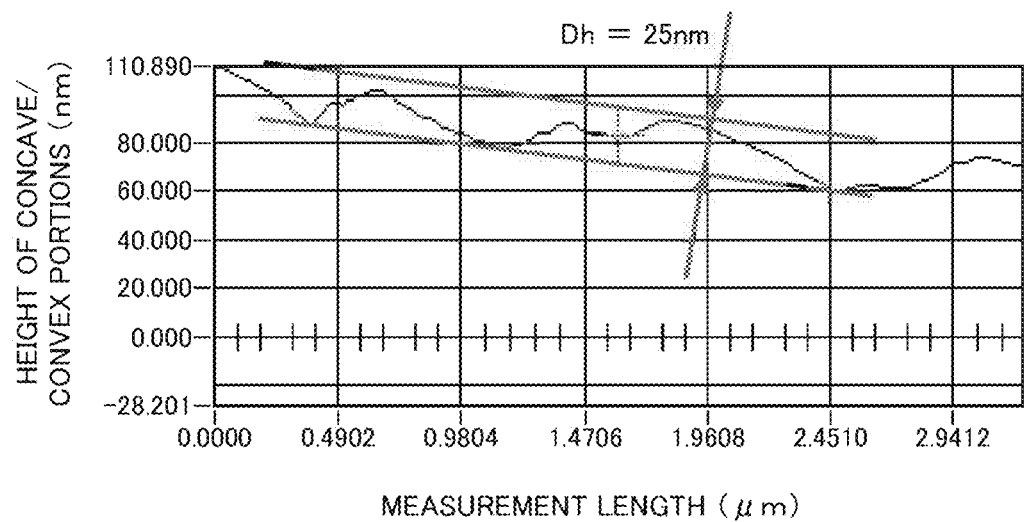
FIG. 6A is a graph showing a result of measurement of the height of indentations of an oxide coating film formed on the surface of a sample as an example of the slide member of the present invention.
Figure 6B:
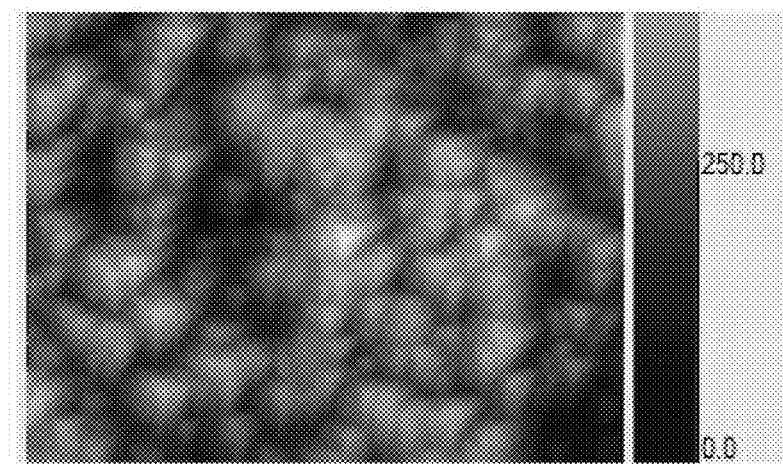
FIG. 6B is a view showing a result of observation of the oxide coating film of FIG. 6A, using an electron microscope.

In FIG. 6A, a horizontal axis indicates a measurement length (unit: µm) and a vertical axis indicates the depth (unit: nm) of the concave/convex shape. As can be seen from FIG. 6A, there are minute indentations with a level of 20 nm on the surface of the oxide coating film. FIG. 6B shows a result of observation of an electron microscope photograph of the surface of the oxide coating film. As can be seen from FIG. 6B, the iron oxide particles are densely gathered together on the surface of the oxide coating film.

Regarding the suction effect of the lubricating oil of the obtained oxide coating film was evaluated using the viscosity of the lubricating oil as a parameter. Specifically, one end of the sample (round rod) was immersed in the lubricating oil with a viscosity of VG5 or VG22 so that the lubricating oil was suctioned up to the surface of the side wall of the sample (the surface provided with the oxide coating film).

Figure 7A:
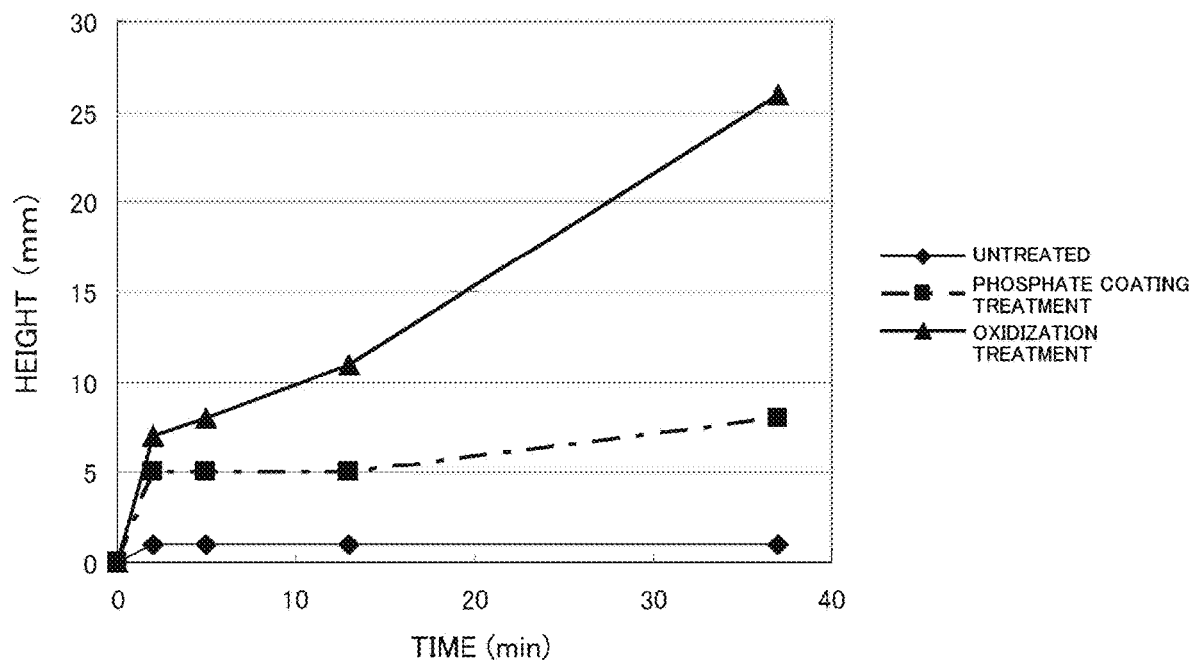
FIGS. 7A and 7B are graphs each of which shows the suction height of lubricating oil, which occurs with time, by the oxide coating film formed on the surface of the sample of FIGS. 6A and 6B.
Figure 7B:
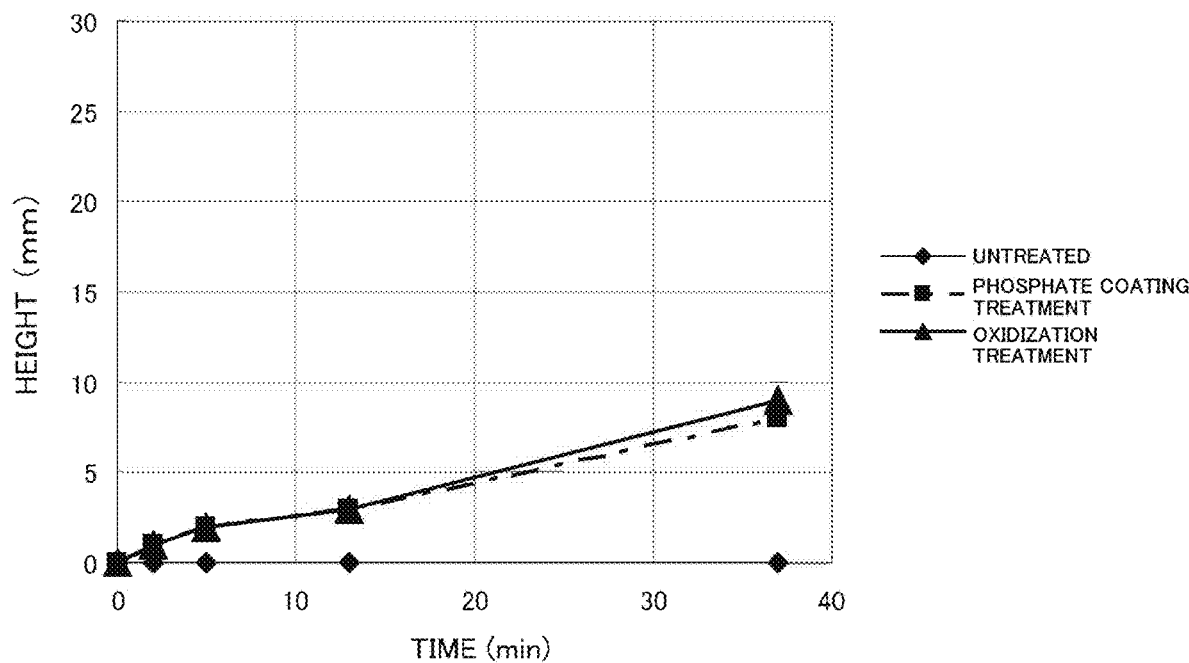

At time points after a passage of 2 minutes, 5 minutes, 12 minutes, and 38 minutes, the heights which the lubricating oil reached were measured, and were plotted in the graph in which a horizontal axis indicates time and a vertical axis indicates height. In this way, the suction effect of the lubricating oil by the obtained oxide coating film was evaluated. FIG. 7A shows a result of measurements using the lubricating oil with a viscosity of VG5, while FIG. 7B shows a result of measurements using the lubricating oil with a viscosity of VG22. In FIGS. 7A and 7B, triangular plots indicate a result of the oxide coating film of Example 1.

Comparative Example 1

On the surface of the base material which was the same as that of Example 1, a porous phosphate coating film was formed by the method disclosed in Patent Literature 1 (Japanese-Laid Open Patent Application Publication No. Hei. 7-238885). In this way, comparative sample was obtained.

Regarding the comparative sample provided with the phosphate coating film, the suction effect of the lubricating oil was evaluated as in the case of Example 1. FIG. 7A shows a result of measurements using the lubricating oil with a viscosity of VG5, while FIG. 7B shows a result of measurements using the lubricating oil with a viscosity of VG22. In FIGS. 7A and 7B, square plots indicate a result of the oxide coating film of Comparative example 1.

Comparative Example 2

Regarding the base material which was the same as that of Example 1 and Comparative example 1 and was not provided with the oxide coating film, the suction effect of the lubricating oil was evaluated as in the case of Example 1. FIG. 7A shows a result of measurements using the lubricating oil with a viscosity of VG5, while FIG. 7B shows a result of measurements using the lubricating oil with a viscosity of VG22. In FIGS. 7A and 7B, rhombic plots indicate a result of the untreated base material of Comparative example 2.

(Comparison Among Example 1, Comparative Example 1 and Comparative Example 2)

As shown in FIG. 7B, in the case where the viscosity of the lubricating oil was VG22, substantially the same suction effect of the lubricating oil was observed in the sample of Example 1, and the comparative sample of Comparative example 1. In contrast, as shown in FIG. 7A, in the case where the viscosity of the lubricating oil was VG5, the suction effect of the sample of Example 1 was much greater than that of the comparative sample of Comparative example 1. As shown in FIGS. 7A and 7B, substantially no suction effect was observed in the sample including only the untreated base material in Comparative example 2.

According to a general expression of a capillary phenomenon, a height h is proportional to a surface tension T and inversely proportional to a contact angle θ. Therefore, it can be seen that the oxide coating film of Example 1 is smaller in contact angle and higher in degree of wetness than the phosphate coating film of Comparative example 1. This may be due to the fact that the oxide coating film of Example 1 has numerous indentations (minute concave/convex portions) on the surface thereof. Therefore, the oxide coating film of the present invention can effectively suction the lubricating oil, and has a high retention capability.

Since the phosphate coating film of Comparative example 1 is porous, its voids are larger in size than the indentations of the oxide coating film of Example 1. Since the oxide coating film of Example 1 is configured such that the iron oxide particles are densely gathered together, the degree of its surface roughness is low. On the other hand, since the phosphate coating film of Comparative example 1 is porous, the degree of its surface roughness is high. In addition, the phosphate coating film is lower in hardness than the oxide coating film. Because of this, it can be considered that the oxide coating film of Example 1 is high in abrasion resistance in addition to the retention capability of the lubricating oil.

Example 2

A ring-shaped base material made of cast iron was prepared, and the oxide coating film of the present invention was formed on the surface of the base material, as in the case of Example 1. In this way, the sample of Example 2 was obtained. The thickness of the oxide coating film of the obtained sample was 1 μm.

Figure 8:
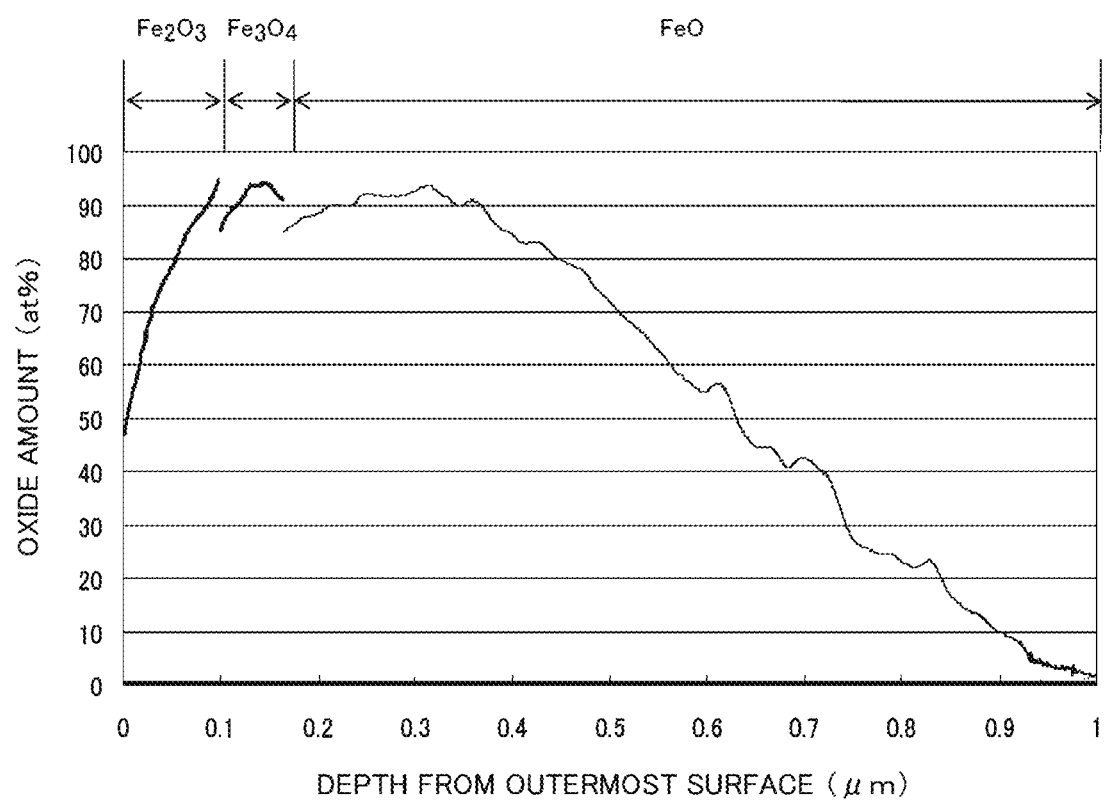
FIG. 8 is a graph showing the relationship between a depth from an outermost surface and the amount of an oxide, in the oxide coating film formed on the surface of a sample as another example of the slide member of the present invention.

The obtained oxide coating film was analyzed by the X-ray diffraction analysis and the glow discharge spectroscopy. FIG. 8 shows a result of the glow discharge spectroscopy. In FIG. 8, a vertical axis indicates an oxide amount (unit: atom %) and a horizontal axis indicates a depth from the outermost surface (outer surface) (unit: μm).

As shown in FIG. 8, the oxide coating film of the sample had the three-layer structure including, the first layer comprising $Fe_2O_3$, the second layer comprising $Fe_3O_4$, and the third layer comprising FeO in this order from the outermost surface. When the thickness of the first layer was T1, the thickness of the second layer was T2 and the thickness of the third layer was T3, T1=0.1 μm, T2=0.1 μm, and T3=0.8 μm, and therefore it was found that T1:T2:T3=5 to 20:10-50:30-85, was satisfied. According to a result of the X-ray diffraction analysis, FeO crystals were not observed in the third layer. Therefore, the third layer was observed as amorphous having no crystalline structure.

Figure 9:
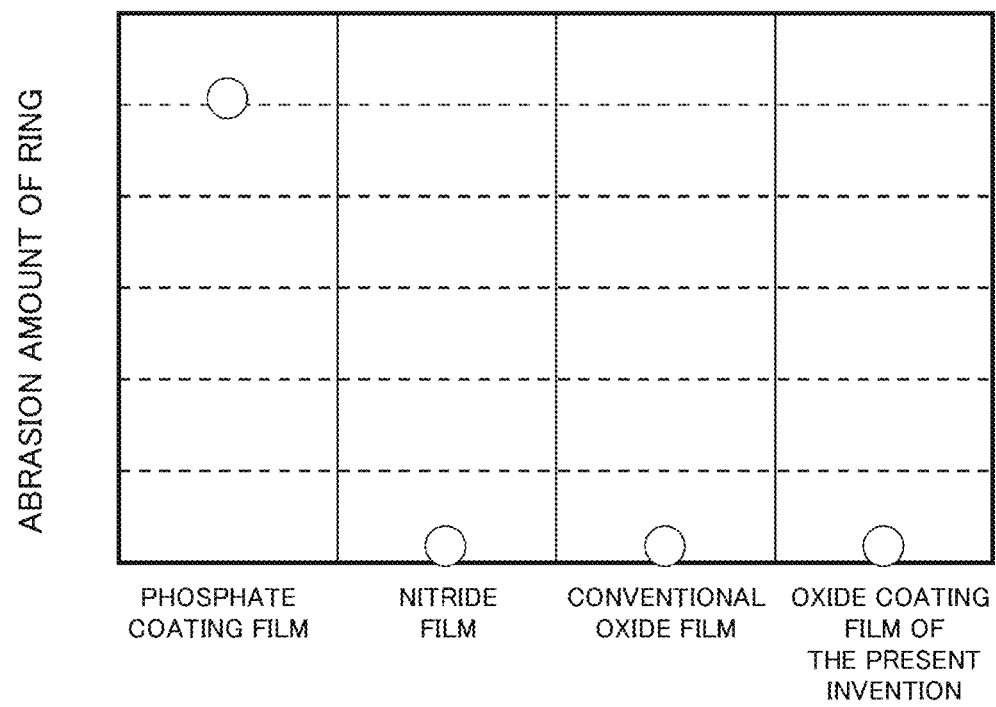
FIG. 9 is a graph showing a ring abrasion amount in a case where a ring on disc abrasion test is conducted on the sample of FIG. 8.
Figure 10:
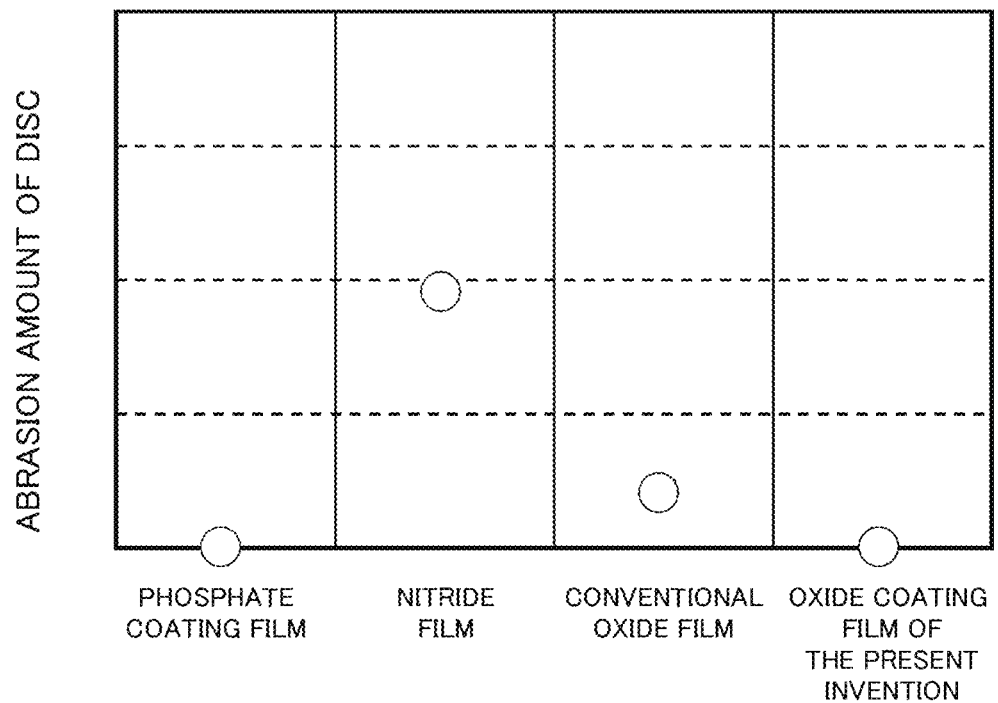
FIG. 10 is a graph showing a disc abrasion amount in a case where the ring on disc abrasion test is conducted on the sample of FIG. 8.

Regarding this sample, a ring on disc abrasion test was conducted in an atmosphere of a mixture of R134a (example of refrigerant gas) and ester oil (example of lubricating oil) with a viscosity of VG3. The abrasion amount of the ring (abrasion amount of the sample) is shown in the graph of FIG. 9, while the abrasion amount of the disc is shown in the graph of FIG. 10.

Comparative Example 3

The porous phosphate coating film was formed on the ring-shaped base material which was the same as that of Example 2, as in the case of Comparative example 1. In this way, comparative example was obtained.

Regarding the obtained comparative sample, the ring on disc abrasion test was conducted as in the case of Example 2. The abrasion amount of the ring (abrasion amount of the sample) is shown in the graph of FIG. 9, while the abrasion amount of the disc is shown in the graph of FIG. 10.

Comparative Example 4

A nitride film as a known hard film was formed on the ring-shaped base material which was the same as that of Example 2, by the method disclosed in Patent Literature 2 (Japanese-Laid Open Patent Application Publication No. Hei. 4-371565). In this way, comparative example was obtained.

Regarding the obtained comparative sample, the ring on disc abrasion test was conducted as in the case of Example 2. The abrasion amount of the ring (abrasion amount of the sample) is shown in the graph of FIG. 9, while the abrasion amount of the disc is shown in the graph of FIG. 10.

Comparative Example 5

An oxidant was mixed into strong caustic soda (sodium hydroxide) aqueous solution, and the ring-shaped base material which was the same as that of Example 2, was treated at a temperature of 140 degrees C. to 145 degrees C., thereby forming a single (mono) layer comprising $Fe_2O_3$ as a general oxide coating film. In this way, comparative sample was obtained.

Regarding the obtained comparative sample, the ring on disc abrasion test was conducted as in the case of Example 2. The abrasion amount of the ring (abrasion amount of the sample) is shown in the graph of FIG. 9, while the abrasion amount of the disc is shown in the graph of FIG. 10.

(Comparison Among Example 2, Comparative Example 3, Comparative Example 4 and Comparative Example 5)

In the ring on disc abrasion test, the sample of example or the comparative sample of comparative example which is the ring corresponds to the second slide member constituting the slide unit, and the disc corresponds to the first slide member. As can be seen from a comparison of FIG. 9 between the abrasion amounts of the oxide coating films formed on the samples of examples and the abrasion amounts of the oxide coating films formed on the comparative samples, the abrasion amount of the phosphate coating film of Comparative example 3 is largest, and the oxide coating film of Example 2, the nitride film of Comparative example 4, and the conventional oxide film of Comparative example 5 are not much abraded.

In contrast, as shown in FIG. 10, when a comparison is made among the abrasion amounts of the disc corresponding to the second slide member (the slide member as "the other material" from the perspective of the first slide member), the abrasion amount of the disc of Comparative example 3 (phosphate coating film) is substantially equal to that of Example 2 (oxide coating film), the abrasion amount of the disc of Comparative example 4 (nitride film) is largest, and the abrasion amount of the disc of Comparative example 5 (conventional oxide film) is the second largest.

The oxide coating film of Example 2 is a coating film comprising the iron oxide particles. The oxide coating film of Example 2 is higher in hardness and chemically more stable than the phosphate coating film of Comparative example 3. Therefore, the oxide coating film of Example 2 is low in affinity (compatibility) with the disc as "the other material". Therefore, it is considered that the abrasion resulting from sliding is less and the amount of the oxide coating film adhering onto the disc surface is lessened significantly. As a result, the abrasion amount of the sample (ring) of Example 2 is less than that of Comparative example 3.

The oxide coating film has the three-layer structure comprising different iron oxides. The first layer comprises $Fe_2O_3$, the second layer comprises $Fe_3O_4$, and the third layer comprises FeO. In general, the crystalline structure of $Fe_2O_3$ is rhombohedral crystal, and therefore is weaker in crystalline structure than $Fe_3O_4$ as cubical crystal. The crystalline structure of the nitride film is hexagonal closed packed crystal, face-centered cubic crystal, or body-centered tetragonal crystal, and is stronger in crystalline structure than FeO as the rhombohedral crystal. Therefore, it is considered that the oxide coating film of Example 2 is lower in hardness of particles than the nitride film of Comparative example 4 or the conventional oxide film ($Fe_2O_3$ single layer) of Comparative example 5.

From the above, it is considered that the oxide coating film of Example 2 can mitigate an attacking characteristic with respect to the disc as "the other material" and improve a compatibility with "the other material", as compared to the nitride film of Comparative example 4 or the conventional oxide film of Comparative example 5. As a result, the abrasion amount of the disc of Example 2 is less than that of Comparative example 4 and that of Comparative example 5.

The oxide coating film of Example 2 has a structure in which the first layer comprising $Fe_2O_3$ is supported on the second layer comprising $Fe_3O_4$ as the cubic crystal which is strong in crystalline structure. In addition, since the third layer comprising FeO has the amorphous structure, a weak structure such as a crystal grain boundary or a lattice defect does not exist in a layer, at an interface between the third layer and the base material (iron based material). This can improve a durability with respect to a load during sliding, and therefore the abrasion of the oxide coating film can be suppressed effectively.

Example 3

A ring-shaped base material made of cast iron with Vickers hardness of 175 Hv was prepared, and the oxide coating film of the present invention was formed on the surface of the base material as in the case of Example 1. In this way, the sample of Example 3 was obtained. The thickness of the oxide coating film of the obtained sample was 3.1 µm.

The obtained oxide coating film was analyzed by the glow discharge spectroscopy and had a three-layer structure as in the case of Example 2. The thickness of the first layer was 0.3 µm, the thickness of the second layer was 0.8 µm, and the thickness of the third layer was 2.0 µm.

Figure 11:
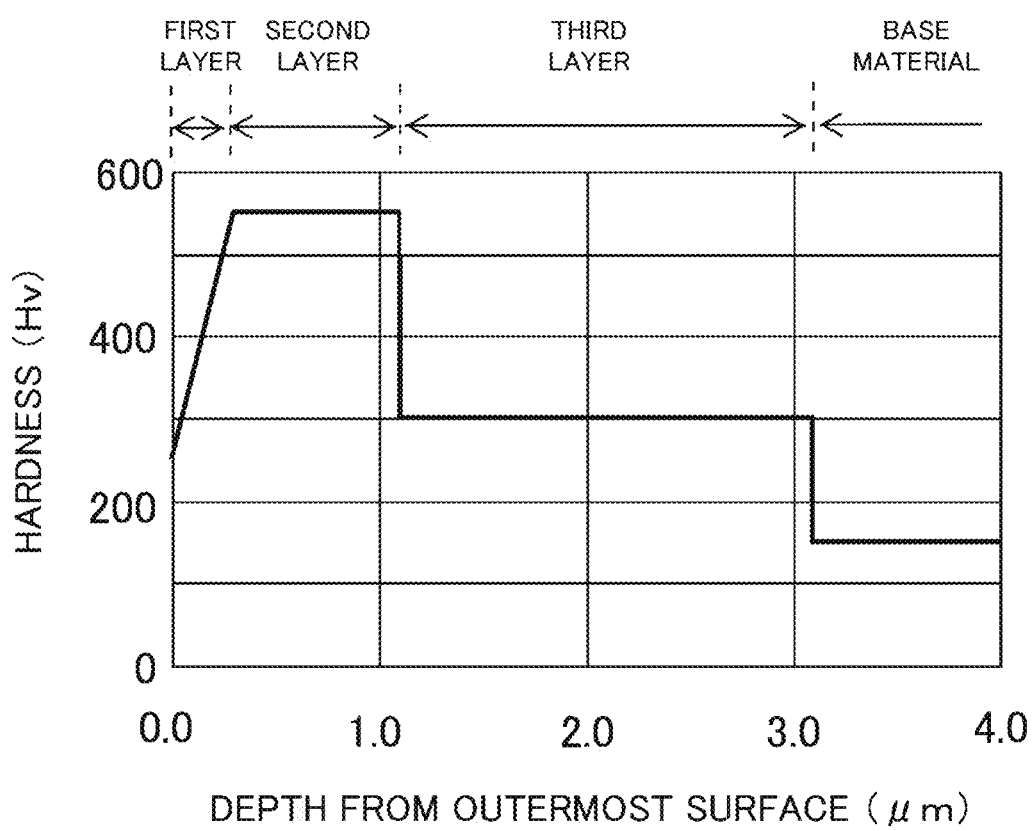
FIG. 11 is a graph showing the relationship between a depth from an outermost surface and hardness, in the oxide coating film formed on the surface of a sample as still another example of the slide member of the present invention.

Vickers hardness of each of the layers was measured based on JISZ2244. A result of Vickers hardness of each of the layers is shown in FIG. 11. In FIG. 11, a vertical axis indicates Vickers hardness (unit: Hv) and a horizontal axis indicates the depth (unit: µm) from the outermost surface (outer surface).

As shown in FIG. 11, in the first layer, the hardness gradually increases as the depth (distance) from the outermost surface increases, while in the second layer, the third layer and the base material, the hardness does not change with a change in the depth. Except for the first layer which changes its hardness, the hardness of the second layer is highest, the hardness of the third layer is the second highest, and the hardness of the base material is lowest.

Figure 12:
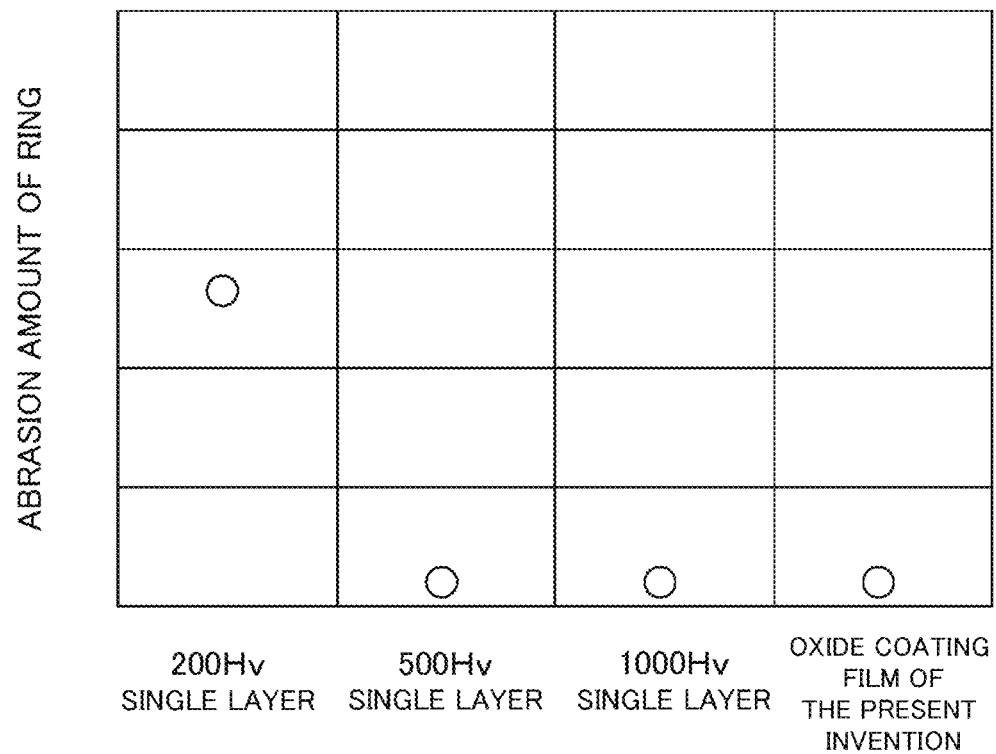
FIG. 12 is a graph showing a ring abrasion amount in a case where the ring on disc abrasion test is conducted on the sample of FIG. 11.
Figure 13:
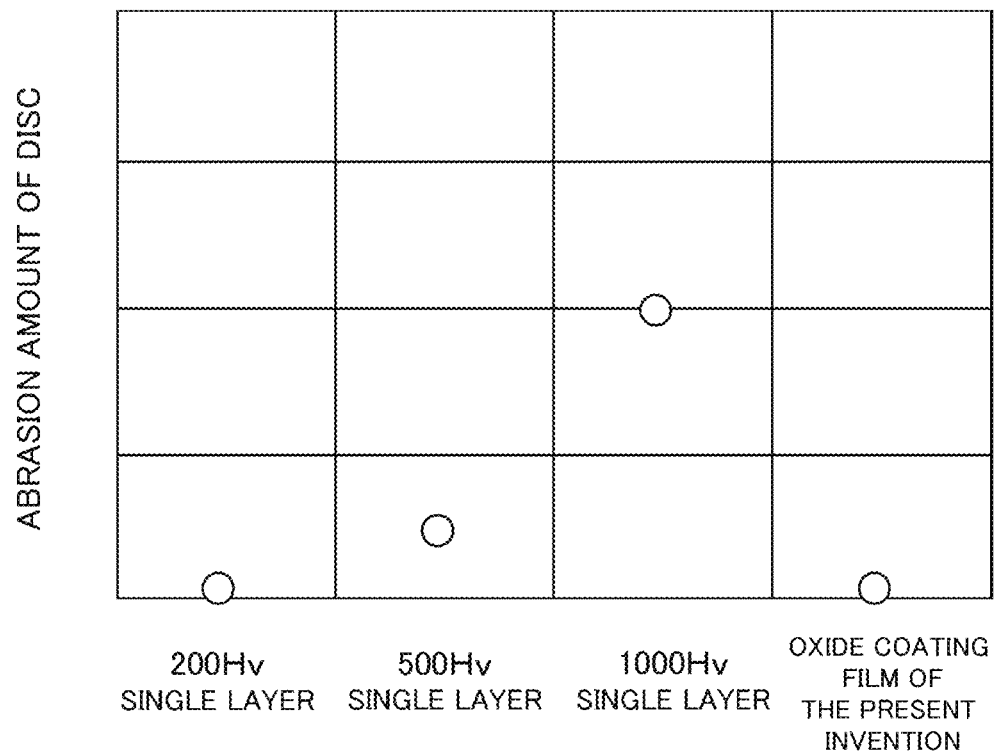
FIG. 13 is a graph showing a disc abrasion amount in a case where the ring on disc abrasion test is conducted on the sample of FIG. 11.
Figure 14:
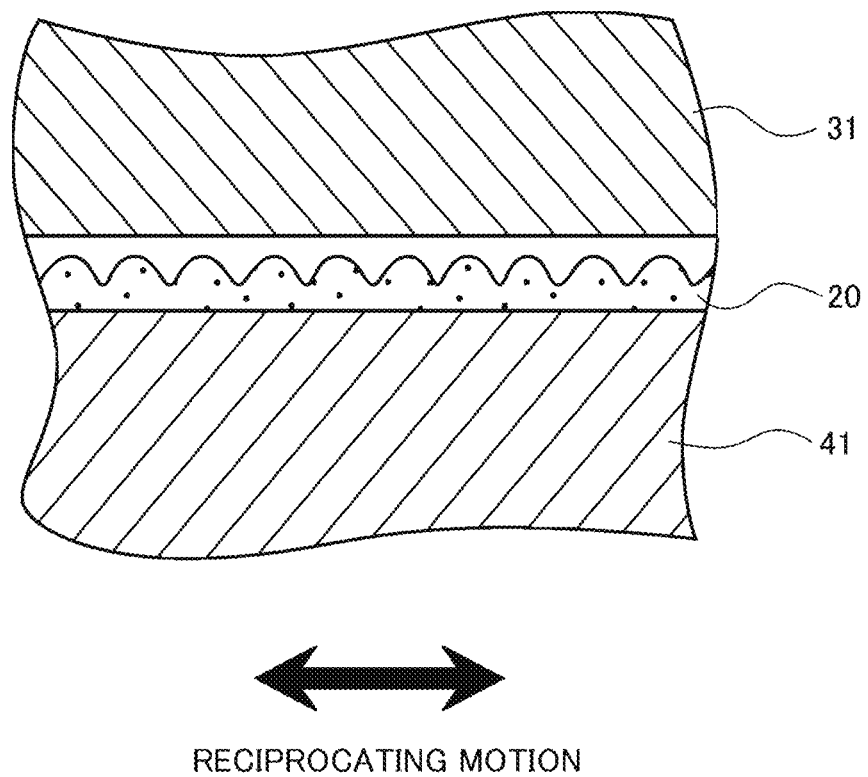
FIG. 14 is a cross-sectional view schematically showing an example of the sliding surface of a piston and the sliding surface of a bore, the piston and the bore being slide members included in a conventional refrigerant compressor.

Regarding this sample, the ring on disc abrasion test was conducted in an atmosphere of a mixture of R134a (example of refrigerant gas) and ester oil (example of lubricating oil) with a viscosity of VG3. The abrasion amount of the ring (abrasion amount of the sample) is shown in the graph of FIG. 12, while the abrasion amount of the disc is shown in the graph of FIG. 13.

Comparative Example 6

As a comparative sample, a ring-shaped base material which was the same as that of Example 3 was used. The hardness of the conventional oxide film formed on the surface of the comparative example (base material) was 200 Hv.

Regarding the obtained comparative sample, the ring on disc abrasion test was conducted as in the case of Example 3. The abrasion amount of the ring (abrasion amount of the sample) is shown in the graph of FIG. 12, while the abrasion amount of the disc is shown in the graph of FIG. 13.

Comparative Example 7

An oxidant was mixed into strong caustic soda (sodium hydroxide) aqueous solution, and the ring-shaped base material which was the same as that of Example 3, was treated at a temperature of 140 degrees C. to 145 degrees C., thereby forming the conventional oxide film. In this way, comparative example was obtained. The hardness of the obtained conventional oxide film was 500 Hv.

Regarding the obtained comparative sample, the ring on disc abrasion test was conducted as in the case of Example 3. The abrasion amount of the ring (abrasion amount of the sample) is shown in the graph of FIG. 12, while the abrasion amount of the disc is shown in the graph of FIG. 13.

Comparative Example 8

A single (mono) layer comprising iron nitride was formed on the ring-shaped base material which was the same as that of Example 2, by the method disclosed in Patent Literature 2. In this way, comparative example was obtained. The hardness of the conventional nitride film was 1000 Hv.

Regarding the obtained comparative sample, the ring on disc abrasion test was conducted as in the case of Example 3. The abrasion amount of the ring (abrasion amount of the sample) is shown in the graph of FIG. 12, while the abrasion amount of the disc is shown in the graph of FIG. 13.

(Comparison Among Example 3, Comparative Example 6, Comparative Example 7 and Comparative Example 8)

As can be seen from FIG. 12, the abrasion amount of the ring corresponding to the second slide member is noticeably large in the coating film of the single layer with a hardness of 200 Hv of Comparative example 6, whereas the coating film of the single layer with a hardness of 500 Hv of Comparative example 7, the coating film of the single layer with a hardness of 1000 Hv of Comparative example 8, and the oxide coating film of Example 3 are not substantially abraded. In contrast, as can be seen from FIG. 13, the abrasion amounts of the disc corresponding to the first slide member increase with an increase in the hardness, in the single layers of Comparative examples 6 to 8, whereas the oxide coating film of Example 3 is not substantially abraded. From the above, it can be seen that the abrasion amount of the ring and the abrasion amount of the disc of the oxide coating film of Example 3 are less.

Among the three layers constituting the oxide coating film of Example 3, the thickness of the first layer is 0.3 µm and the hardness of the outermost surface of the first layer is 250 Hv. As shown in FIG. 11, the first layer has a hardness distribution in which its hardness increases from the outermost surface toward the center of the cross-section of the base material, and is 550 Hv at a boundary between the first layer and the second layer. Therefore, it is considered that the first layer has a low attacking characteristic with respect to the disc as the "other material" and has a higher compatibility with the disc.

In addition, as can be clearly seen from the result of Example 1, in the structure of the first layer in which the iron oxide particles are densely gathered together, the hardness increases with an increase in the depth, so that a compatibility with "the other material" is improved, and a friction coefficient with "the other material" is reduced.

The second layer has a thickness of 0.8 µm which is larger than that of the first layer and has the highest hardness which is 550 Hv. For example, even if the abrasion power resulting from sliding remains within the slide unit (between the first slide member and the second slide member), a progress of the abrasion of the oxide coating film can be suppressed. The third layer has a thickness of 2.0 µm which is larger than that of the first layer and that of the second layer and has a hardness of 300 Hv. Therefore, it is considered that a difference in hardness with the base material (hardness: 175 Hv) is lessened, and an adhesiveness with the base material is improved.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

The present invention can attain a higher reliability in a refrigerant compressor including a slide unit, which uses lubricating oil with a low viscosity for a higher efficiency. Therefore, the present invention is widely suitably used in the fields of devices incorporating the refrigerant compressor.

REFERENCE SIGNS LIST 100 refrigerant compressor
101 sealed container
102 suction pipe
103 lubricating oil
110 electric component
111 stator
112 rotor
113 flange surface (slide member)
120 compression component
121 crankshaft (slide member)
122 main shaft section (slide member)
123 eccentric shaft (slide member)
130 thrust bearing section (slide member)
131 cylinder block (slide member)
132 bore (slide member)
133 thrust section (slide member)
134 thrust washer (slide member)
140 compression chamber
141 piston (slide member)
142 piston pin (slide member)
143 connecting rod (slide member)
150 base material (slide member)
160 refrigerator
170 air conditioner
200 oxide coating film
201 first layer
202 second layer
203 third layer
210 indentation (minute concave/convex portion)
220 outer surface (outermost surface)

The invention claimed is:

1. A slide member which is used in a slide unit which is included in a refrigerant compressor for compressing a refrigerant and provided inside a sealed container which reserves lubricating oil having a viscosity in a range of VG3 to VG100 therein, the slide member comprising:
a sliding surface comprising an oxide coating film formed directly on a surface of a base material of the slide member, the base material comprising an iron based material, the oxide coating film being entirely formed on the surface of the base material by oxidizing the base material, and the oxide coating film being provided on the entirety of the sliding surface, wherein
the oxide coating film comprises a three-layer structure including a first layer comprising $Fe_2O_3$, a second layer comprising $Fe_3O_4$, and a third layer comprising FeO in this order from an outermost surface of the slide member, and
the oxide coating film has a dense structure and minute concave/convex portions with a height difference in a range of 0.01 µm to 0.1 µm, the concave/convex portions being on an outermost surface of the slide member.

2. The slide member according to claim 1, wherein the first layer has a thickness T1, the second layer has a thickness T2, and the third layer has a thickness T3 such that a ratio of T1:T2:T3 is at or within the ranges 5 to 20:10 to 50:30 to 85.

3. The slide member according to claim 1, wherein the third layer comprises FeO having an amorphous structure.

4. The slide member according to claim 1, wherein the oxide coating film including the first layer, the second layer and the third layer has a thickness in a range of 1 µm to 3 µm.

5. The slide member according to claim 1, wherein at least the first layer has a structure in which iron oxide particles are gathered together in a layer form; and
wherein the iron oxide particles have a particle diameter in a range of 0.1 µm to 4.0 µm.

6. A refrigerant compressor comprising:
a sealed container which reserves lubricating oil having a viscosity in the range of VG3 to VG100 therein;
an electric component accommodated in the sealed container; and
a compression component which is accommodated in the sealed container and activated by the electric component to compress a refrigerant;
wherein the compression component includes a slide unit including the slide member according to claim 1.

7. The refrigerant compressor according to claim 6, wherein the compression component includes:
a crankshaft including a main shaft section and an eccentric shaft;
a bearing section which supports the main shaft section such that the main shaft section is rotatable;
a thrust section formed in the bearing section;
a cylinder block having a bore defining a compression chamber;
a piston which is reciprocatable inside the compression chamber;
a piston pin which is placed in parallel with the eccentric shaft and fastened to the piston; and
a connecting rod for connecting the eccentric shaft to the piston;
wherein the slide member is at least one of the crankshaft, the thrust section, the bore of the cylinder block, the piston, the piston pin, and the connecting rod.

8. The refrigerant compressor according to claim 6, wherein the electric component is inverter-driven at any one of operating frequencies including at least an operating frequency which is equal to or lower than a power supply frequency.

9. The refrigerant compressor according to claim 6, wherein at least a natural refrigerant or a HFC based refrigerant is used as the refrigerant compressed by the compression component.

10. The refrigerant compressor according to claim 9, wherein the natural refrigerant is at least one of R600a, R290, and R744, or a mixture of R600a, R290, and R744.

11. The refrigerant compressor according to claim 10, wherein at least one selected from a group consisting of mineral oil, ester oil, alkyl benzene oil, polyvinyl ether, and polyalkylene glycol is used as the lubricating oil.

12. The refrigerant compressor according to claim 9, wherein the HFC based refrigerant is at least one of R134a, R152, R407C, R404A, R410, and R32, or a mixture of R134a, R152, R407C, R404A, R410, and R32.

13. The refrigerant compressor according to claim 12, wherein at least one selected from a group consisting of ester oil, alkyl benzene oil, polyvinyl ether, and polyalkylene glycol is used as the lubricating oil.

14. A refrigerator comprising the refrigerant compressor according to claim 6.

15. An air conditioner comprising the refrigerant compressor according to claim 6.

16. The slide member according to claim 1, wherein the first layer provides the outermost surface of the slide member that is configured to be exposed to sliding wear.

\* \* \* \* \*